(12) United States Patent
Bollman

(10) Patent No.: US 10,280,961 B1
(45) Date of Patent: May 7, 2019

(54) THREE-DIMENSIONAL POSITIONING AND HOLDING MODULE SYSTEM FOR MODULAR WORKSTATIONS

(71) Applicant: Clifford Bollman, Vancouver, WA (US)

(72) Inventor: Clifford Bollman, Vancouver, WA (US)

( * ) Notice: Subject to any disclaimer, the term of this patent is extended or adjusted under 35 U.S.C. 154(b) by 0 days.

(21) Appl. No.: 15/823,302

(22) Filed: Nov. 27, 2017

Related U.S. Application Data

(63) Continuation-in-part of application No. 15/466,609, filed on Mar. 22, 2017, now Pat. No. 9,829,025, which is a continuation of application No. 15/080,506, filed on Mar. 24, 2016, now Pat. No. 9,637,921.

(60) Provisional application No. 62/590,983, filed on Nov. 27, 2017.

(51) Int. Cl.
| | |
|---|---|
| *F16M 11/00* | (2006.01) |
| *F16B 12/44* | (2006.01) |
| *A47B 13/02* | (2006.01) |
| *E04C 3/04* | (2006.01) |
| *E04B 1/24* | (2006.01) |
| *A47B 21/04* | (2006.01) |
| *E04C 3/29* | (2006.01) |
| *F16B 7/18* | (2006.01) |

(52) U.S. Cl.
CPC .............. *F16B 12/44* (2013.01); *A47B 13/02* (2013.01); *A47B 21/04* (2013.01); *E04B 1/24* (2013.01); *E04C 3/04* (2013.01); *E04C 3/29* (2013.01); *A47B 2200/0016* (2013.01); *E04B 2001/2472* (2013.01); *E04C 2003/0413* (2013.01); *E04C 2003/0421* (2013.01); *E04C 2003/0439* (2013.01); *E04C 2003/0465* (2013.01); *F16B 7/187* (2013.01)

(58) Field of Classification Search
CPC ............ E04G 3/28; F16B 12/44; A47B 13/02
See application file for complete search history.

(56) References Cited

U.S. PATENT DOCUMENTS

| | | | | |
|---|---|---|---|---|
| 4,828,073 | A * | 5/1989 | Friday | ........................ E04G 3/28 |
| | | | | 182/150 |
| 9,803,380 | B2 * | 10/2017 | Simmons | ................ E04G 5/067 |

* cited by examiner

*Primary Examiner* — Amy J. Sterling
(74) *Attorney, Agent, or Firm* — Rylander & Associates, PC; Philip R. M. Hunt

(57) ABSTRACT

A Three-Dimensional Positioning and Holding Modular System for office and industrial work stations including embodiments of multi-rail beams and rail-arm-leg modules. The embodiments have tubes, bars, or channels arranged and connected in ways that provide improved ability to transmit torque along a long axis of the multi-rail beam while providing improved resistance to twisting under the forces of the torque.

17 Claims, 32 Drawing Sheets

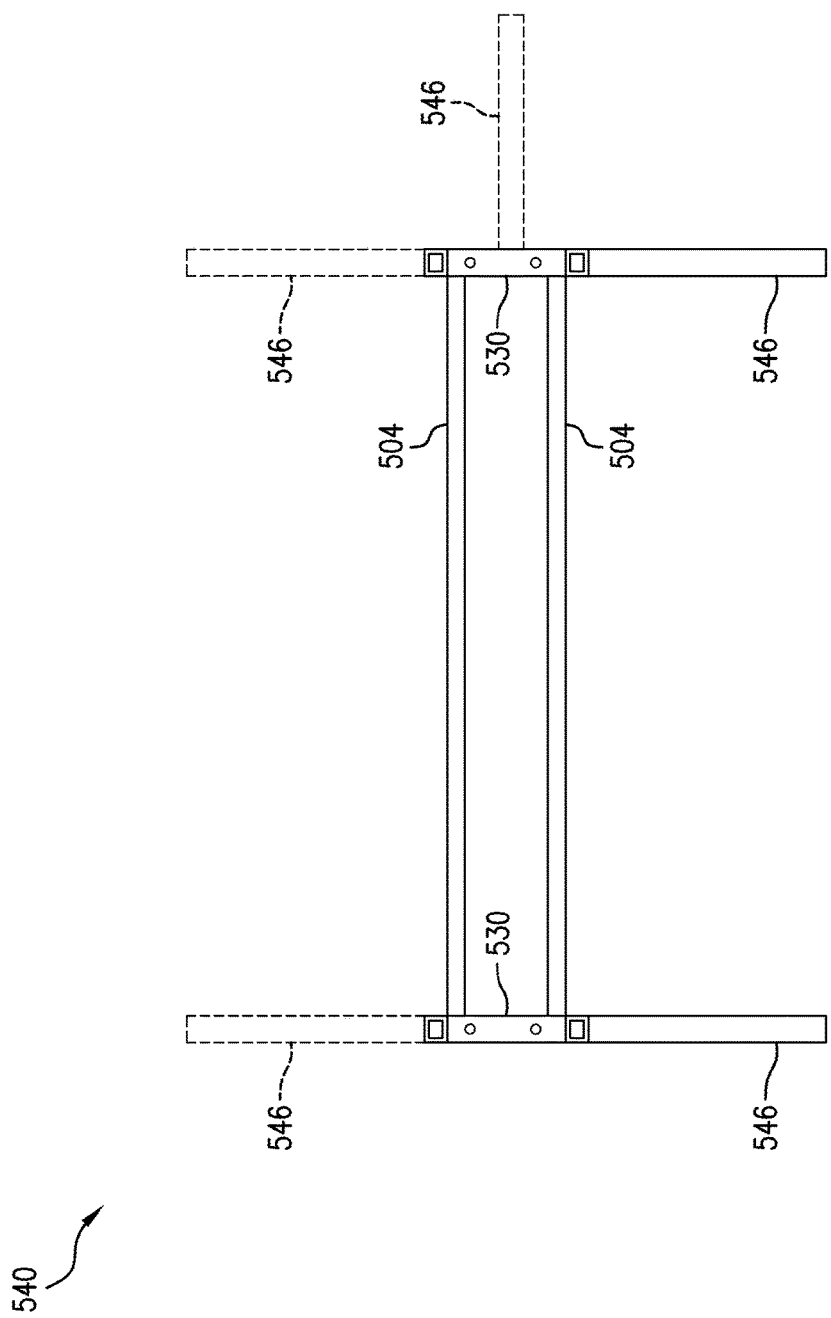

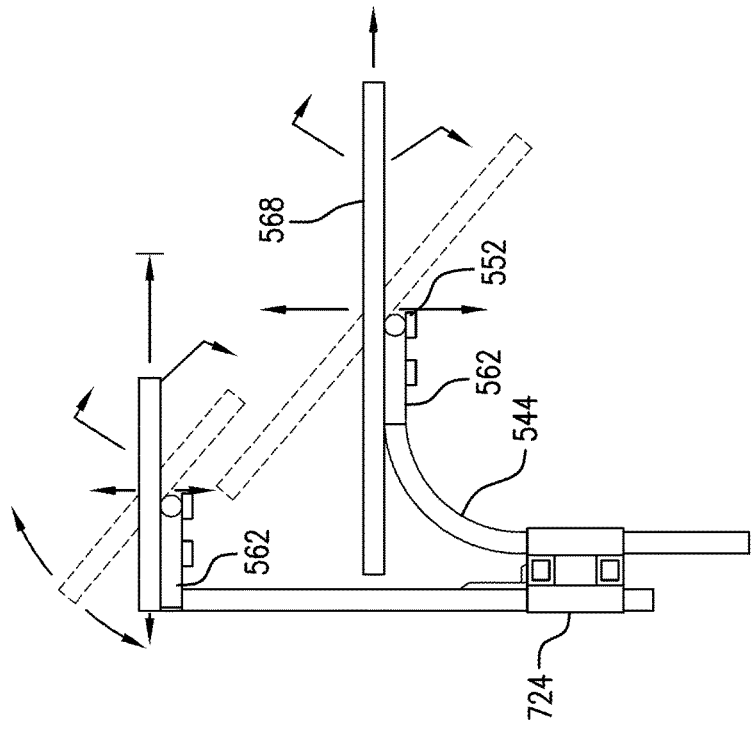
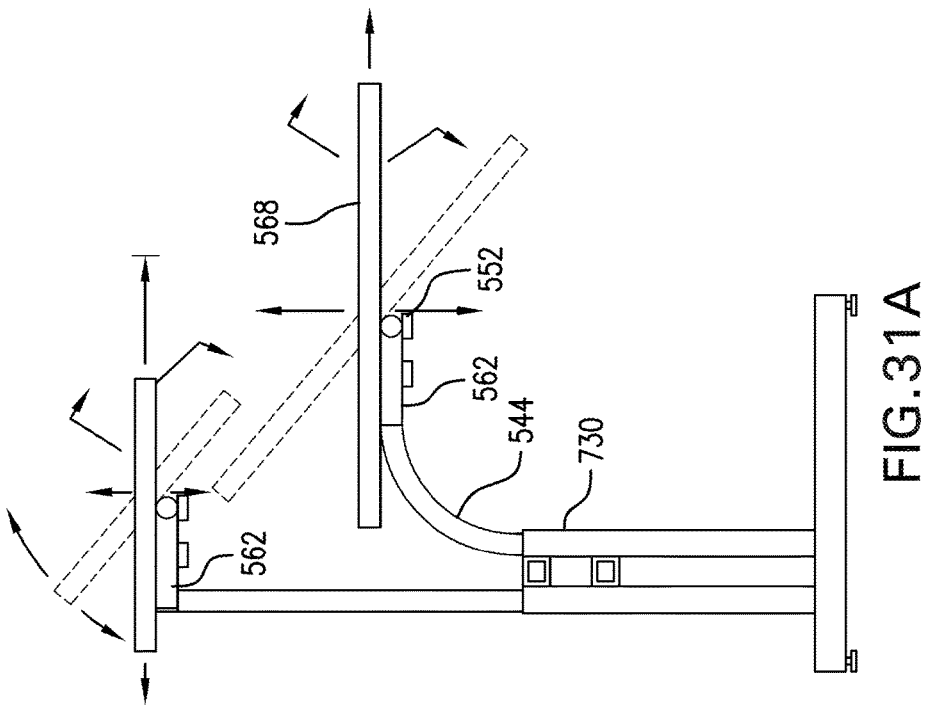

THREE-DIMENSIONAL POSITIONING AND HOLDING MODULE SYSTEM FOR MODULAR WORKSTATIONS

CROSS-REFERENCE TO RELATED APPLICATION

The present application is a continuation-in-part application of application Ser. No. 15/466,609, filed 2017 Mar. 22, which is a continuation of application Ser. No. 15/080,506, filed 2016 Mar. 24, now U.S. Pat. No. 9,637,921, issued 2017 May 2, all incorporated herein by reference. This application also claims the benefit of U.S. Provisional Application No. 62/590,983, filed 2017 Nov. 27, incorporated herein by reference.

TECHNICAL FIELD

The present invention relates to modular assembly systems. More particularly, the present invention relates to modular assembly systems for office and industrial work stations.

BACKGROUND

Modular building assembly systems have long been available to for the construction and erection of various structures such as office cubicles, industrial work stations, and scaffolding. Such modular building assembly systems usually have some type of standard beam that can be joined to other beams and to which various accessories can be attached. Solid bars, of circular or regular polygonal shape (such as square or hexagonal) may be used, but are inferior to tubes of the same shape because tubes have a better resistance to torsion for the same mass of material than do solid bars. Circular or regular polygons lack an easy point of attachment for accessories and other beams, so more complex shapes are preferred. One such complex shaped beam is a cruciform beam (see U.S. Pat. No. 5,481,842 to Gautreau, FIG. 1). The cruciform beam comprises a center tube surrounded by four angle bars arranged in a square pattern in cross-section and each joined to the center tube with a web or fin, the fins forming a cross when the beam is viewed in cross-section. Accessories can be attached along the cruciform beam by clamping the accessory to one of the angle bars or in a longitudinal groove defined by the spaces between the fins and angle bars. The cruciform beam is relatively strong in resisting buckling when torsion is applied to the beam around an axis orthogonal to the long axis of the cruciform beam because in cross-section, a substantial amount of the beam material is distant from the center longitudinal axis. Such torsion occurs when the cruciform beam spans a space and a load is attached to the beam somewhere in the middle. However, the cruciform beam is not relatively strong when torsion is applied around the long axis of the cruciform beam. Such torsion occurs when a load is cantilevered from the side of the cruciform beam. Since a cruciform beam for a given size and weight does not have good resistance to torsion around its long axis, accessories are usually not cantilevered from the side of the cruciform beam.

What is needed is a modular building system with a beam that has strong resistance to torsion around its long axis.

BRIEF DESCRIPTION OF THE DRAWINGS

The accompanying drawings, which are incorporated into and constitute a part of this specification, illustrate one or more embodiments of the inventive subject matter and, together with the detailed description, serve to explain the principles and implementations thereof. Like reference numbers and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

FIGS. 7A and 7B show a first embodiment of a workstation module.

FIG. 31A shows a side view of a twin rail H module with arms and work surfaces attached.

FIG. 31B shows a side view of a double drop-on rail clip bracket with arms and work surfaces attached.

DETAILED DESCRIPTION

Figure 1:
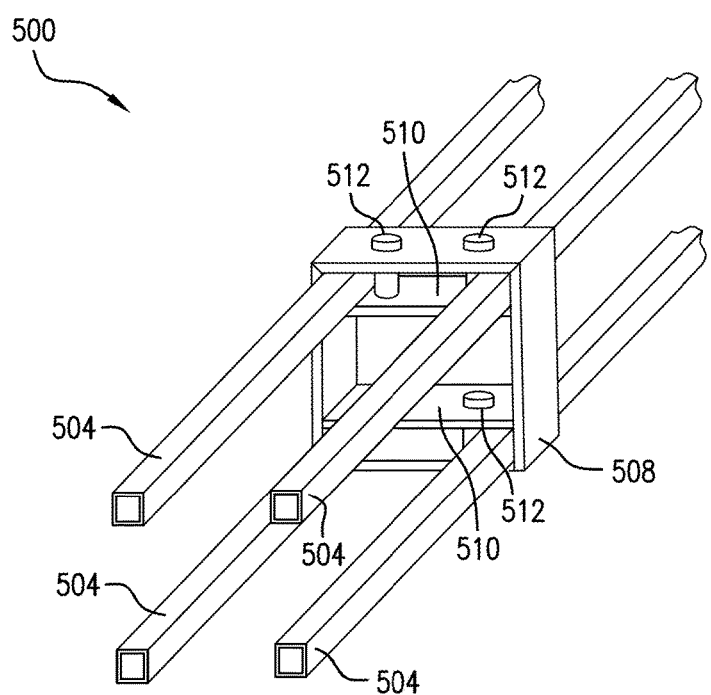
FIG. 1 shows a first representative embodiment of a quad-rail beam.

In describing the one or more representative embodiments of the inventive subject matter, use of directional terms such as "upper," "lower," "above," "below", "in front of" "behind," etc., unless otherwise stated, are intended to describe the positions and/or orientations of various components relative to one another as shown in the various Figures and are not intended to impose limitations on any position and/or orientation of any component relative to any reference point external to the Figures.

In the interest of clarity, not all of the routine features of representative embodiments of the inventive subject matter described herein are shown and described. It will, of course, be appreciated that in the development of any such actual implementation, numerous implementation-specific decisions must be made in order to achieve specific goals, such as compliance with application and business-related constraints, and that these specific goals will vary from one implementation to another and from one developer to another. Those skilled in the art will recognize that numerous modifications and changes may be made to the representative embodiment(s) without departing from the scope of the claims. It will, of course, be understood that modifications of the representative embodiments will be apparent to those skilled in the art, some being apparent only after study, others being matters of routine mechanical, chemical and electronic design. No single feature, function or property of the representative embodiments is essential. In addition to the embodiments described, other embodiments of the inventive subject matter are possible, their specific designs depending upon the particular application. As such, the scope of the inventive subject matter should not be limited by the particular embodiments herein described but should be defined only by the appended claims and equivalents thereof.

Three-Dimensional Positioning and Holding Modular System

The Three-Dimensional Positioning and Holding Modular System is a flexible system for building ergonomic working stations that maximizes three-dimensional utilization of a workspace. The Three-Dimensional Positioning and Holding Modular System comprises substructure modules and positioning holders. The substructure modules provide the foundation on which the positioning holders may be mounted. The positioning holders hold physical components needed for the work of the work station, such as table tops or other work surfaces, lighting fixtures, computer monitors, cable management, and storage bins.

Rails

A rail 504 in the Three-Dimensional Positioning and Holding Modular System is a tube, typically rectangular or square in cross section, but in alternative embodiments, may have a different cross-section, such as circular. (See FIG. 1). A rail 504 may have zero, one or more fastener holes 514 to facilitate coupling to other rails 504, to position holders, slices, etc. (See e.g. FIG. 3 and FIG. 4). The fastener holes 514 typically penetrate through the rail 504 orthogonal to the long axis of the rail 504. A rail 504 may have fastener holes 514 spaced at periodic intervals along the rail 504, referred herein as a perforated rail. (See e.g. FIG. 29 and FIG. 32). Perforated rails typically have fastener holes at 2 inch intervals. The fastener holes 514 in the rails 504 are typically unthreaded, but some may be threaded. A rail 504 is typically made of metal, such as steel, but may be made of other suitable materials. A rail 504 is typically 1¼ inch square cross-section, 14 gauge tube thickness. Length of perforated rails are typically 30 to 120 inches.

Quad-Rail Beam Module

One substructure module for use with the Three-Dimensional Positioning and Holding Modular System is a quad-rail beam 500. FIG. 1 shows a representative embodiment of a quad-rail beam 500. The quad-rail beam 500 comprises four rails 504 coupled by at least one peripheral binding structure such as the rail support bracket 508, clamp plate 510 and fasteners 512 shown in FIG. 1, which are configured to hold each of four rails 504 in a rectangular pattern.

The rail support bracket 508 is typically a rectangular tube, typically square in cross section, but in alternative embodiments, may have a different cross-section. The rail support bracket 508 has a bracket interior that conforms to the rectangular pattern. The rail support bracket 508 is typically used with at least one, or more typically, two clamp plates 510. Each clamp plate 510 and one or more sides of the rail support bracket 508 each have at least one, or more typically, two fastener holes 514. The fastener holes 514 are typically unthreaded, but in some embodiments may be threaded. Each clamp plate 510 is used to secure one, or more typically, two rails 504 to the rail support bracket 508. Each clamp plate 510 is secured to the rail support bracket 508 with at least one fastener 512, but two are typically used. Each fastener 512 passes through one of the fastener holes 514 in the rail support bracket 508 and a matching fastener hole 514 in the clamp plate 510. Each fastener 512 and associated fastener holes 514 are positioned to hold an adjacent rail 504 between the fastener 512 and an adjacent side of the rail support bracket 508 with at least a sliding fit. However, the rails 504 are primarily held in place by friction induced by tension in the fasteners 512 drawing the clamp plate 510 and the rail support bracket 508 together. Therefore, in some embodiments, the fasteners 512 may not necessarily be adjacent and in sliding contact with the rails 504.

The first exemplary embodiment quad-rail beam 500 is configured so that each of the four of rails 504 of the quad-rail beam 500 there is a gap that is at least as large as a largest cross-sectional dimension of one of the four rails. This is to ensure that the rails 504 are far enough apart to give the first exemplary embodiment quad-rail beam 500 good resistance to torsional twisting.

The quad-rail beam 500 has a cavity therein defined as an area between the inside corners of the four rails 504 and running a length of the four rails 504. The cavity contains no load bearing structure connecting the rails that runs for more than a total of a half of the length of the rails. This arrangement makes efficient use of mass since structure in the cavity will have little resistance to torque induced twist.

Typically, each rail 504 has dimensions of 1 inch per side in cross-section, 14-gauge thickness and 40 inches long. The rail support bracket 508 has typical dimensions of 6 inches per side in the interior of the bracket. These dimensions provide 4 inch gaps between the rails 504, which provides good resistance to twist induced by torque, and which also provides a convenient sized gap into which a typical worker can reach into and attach, detach or adjust accessory brackets and other attachments. However, in alternative embodiments, other dimensions of rails 504 and rail support brackets 508 may be used.

The quad-rail beam 500 has a structure that for its weight is highly resistant to twist induced by torque about its long axis (parallel to the rails 504). For example, a torque is applied to the first representative embodiment quad-rail beam 500, when a force is applied to one or more of the rails 504 in a direction that is orthogonal to the long axis of the quad-rail beam 500, but does not pass through the long axis. The torque is transmitted along the rail 504 to the nearest rail support brackets 508. The rail support brackets 508 transfer the torque to the other rails 504. All the rails 504 and the rail support brackets 508 play a role in resisting the twist induced by the torque. Resistance to torque is proportional to the mass of an object times the distance of the mass from the torque axis. Most of the mass in the quad-rail beam 500 is fairly distant from its long axis, so for its mass, it offers a high degree of resistance to being twisted by torque. Resistance to twist from torque can be increased by adding additional rail support brackets 508 to the quad-rail beam 500 and/or decreasing the distance between them. Since each rail 504 is itself a tube, it also offers a high degree of resistance to twisting from torque induced by forces applied to the rail 504 in a direction that does not pass through the long axis of the rail 504.

Open Quad Rail-Arm-Leg (RAL) Module

Figure 2A:
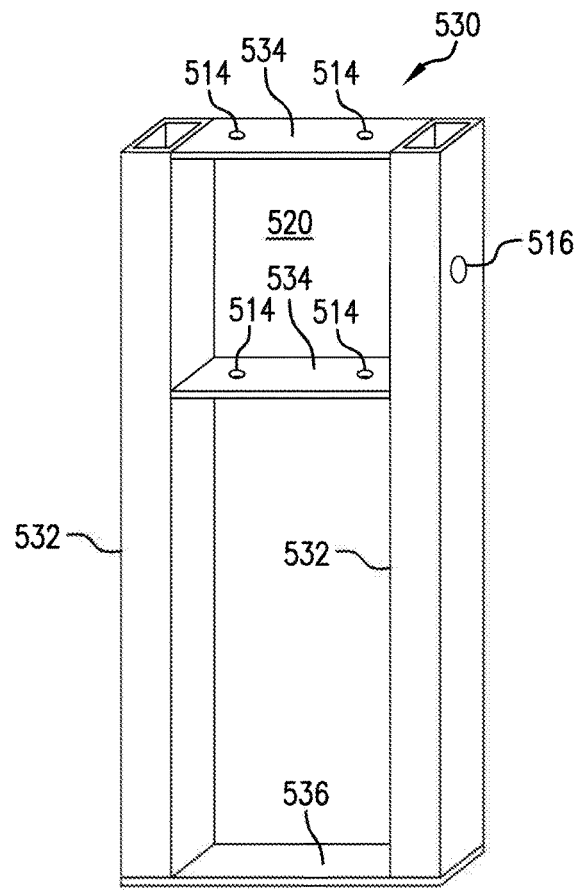
FIGS. 2A and 2B show a first embodiment of a rail-arm-leg (RAL) module.
Figure 2B:
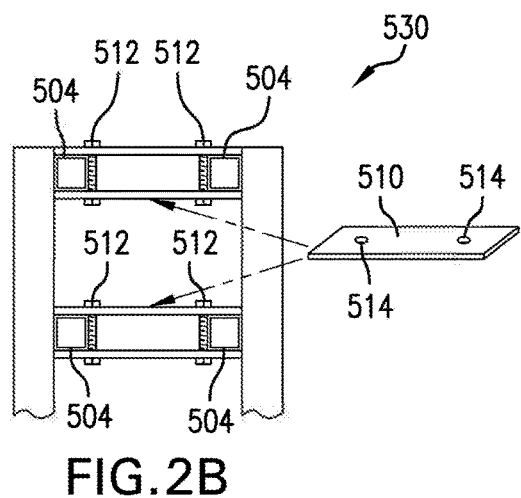

Another substructure for use with the Three-Dimensional Positioning and Holding Modular System is an open quad rail-arm-leg (RAL) module 530. FIGS. 2A and 2B show a representative embodiment of an open quad rail-arm-leg module 530. The open quad rail-arm-leg module 530 is named for what it is configured to have attached to it—rails, arms and legs. The open quad rail-arm-leg module 530 is part of a peripheral binding structure that also includes two clamp plates 510 and a plurality of fasteners 512 and is configured to hold each of four rails 504 in a rectangular pattern. The open quad rail-arm-leg module 530 comprises two columns 532 coupled by two cross plates 534 and a bottom plate 536. The columns 532 are typically orthogonal from the cross plates 534 and the bottom plate 536, with the two columns 532 arranged vertically in parallel and the two cross plates 534 and bottom plate 536 arranged horizontally in parallel. The columns 532 and the cross plates 534 define a module interior 520 that is open with a perimeter conforming to the rectangular pattern. The columns 532, the cross plates 534, and the bottom plate 536 are typically made of metal, such as steel, and coupled by welding, but may be made of other suitable materials and joined by other methods.

The columns 532 are hollow tubes with open top and bottom ends. In some embodiments, the bottom ends of the column 532 are closed off. Each column 532 has one or more threaded hole 516, typically in the outside of the column 532. The threaded hole 516 allows for insertion of a set screw to secure accessories inserted inside the column 532. Each column 532 is typically rectangular in cross-section and may be square. In other embodiments, other suitable cross-sections, such as circular, may be used.

The open quad rail-arm-leg module 530 is typically used with at least one, or more typically, two clamp plates 510. Each clamp plate 510 is typically the same size and shape as the cross plates 534. The clamp plates 510 and the cross plates 534 have at least one, or more typically, two fastener holes 514. The fastener holes 514 are typically unthreaded, but in some embodiments, may be threaded. Each clamp plate 510 is used to secure one, or more typically, two rails 504 to the open quad rail-arm-leg module 530. Each clamp plate 510 is secured to one of the cross plates 534 with at least one fastener 512, but two are typically used. Each fastener 512 passes through one of the fastener holes 514 in the cross plate 534 and a matching fastener hole 514 in the clamp plate 510. Each fastener 512 and associated fastener holes 514 are positioned to hold an adjacent rail 504 between the fastener 512 and an adjacent column 532 with at least a sliding fit. However, the rails 504 are primarily held in place by friction induced by tension in the fasteners 512 drawing the clamp plate 510 and the rail support bracket 508 together. Therefore, in some embodiments, the fasteners 512 may not necessarily be adjacent and in sliding contact with the rails 504.

The typical dimensions for the open quad rail-arm-leg module 530 are 20 inches high and 8½ inches wide across the front. The interior space of the open quad rail-arm-leg module 530 is typically 6 inches wide between the columns 532, 6 inches between the two cross plates 534, and 1½ inches deep. These dimensions are convenient for building industrial workstations, but other dimensions may be used. The cross plate 534 nearest the top of the open quad rail-arm-leg module 530 is typically flush with the top of the columns 532, but in some embodiments, may be positioned lower.

Rail Splices

Rail splices are used to couple two or more rails 504. At least three different rail splices may be used in the Three-Dimensional Positioning and Holding Modular System—an in-line splice 624, a perpendicular rail splice 628, and a clip splice 634.

Figure 3:
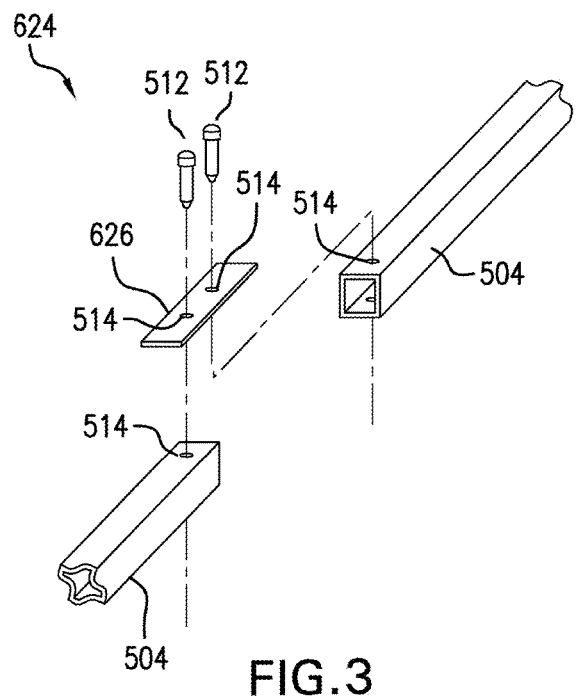
FIG. 3 shows an exploded perspective view of an in-line splice.

FIG. 3 shows an exploded perspective view of an in-line splice 624 connecting two rails 504 that are in-line which each other and abut each other. The in-line rail splice 624 comprises two fasteners 512 and a nut plate 626 with a first fastener hole 514 and a second fastener hole 514. When coupling the two rails 504, the first fastener hole 514 is configured to line up with a fastener hole 514 in one rail 504 through which one of the fasteners 512 is passed. The second fastener hole 514 is configured to line up with a fastener hole 514 in the other rail 504 through which the other fastener 512 is passed. The fastener 512 may be a rivet, a threaded cap screw and nut or other appropriate type of fastener. The fastener holes 514 are typically unthreaded but may be threaded. In some embodiments, each in-line rail splice 624 has two nut plates 626, one above the rails 504 and the other below.

Figure 4:
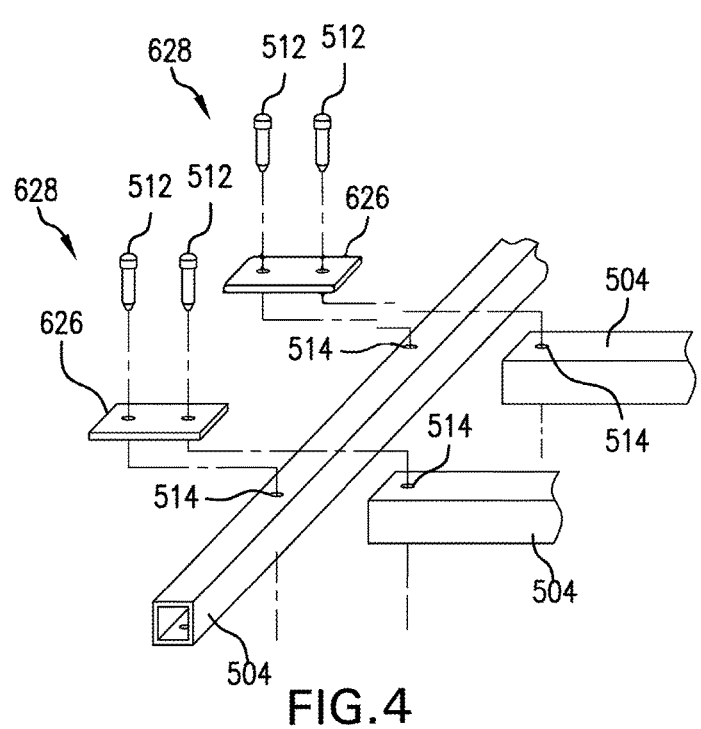
FIG. 4 shows an exploded perspective view of two perpendicular rail splices.

FIG. 4 shows an exploded perspective view of two perpendicular rail splices 628 connecting a single rail 504 to a pair of parallel rails 504 that are parallel to each other and perpendicular to the single rail 504. Each perpendicular rail splice 628 comprises two fasteners 512 and a nut plate 626 with a first fastener hole 514 and a second fastener hole 514. When coupling the single rail 504 to the set of parallel rails, the first fastener hole 514 is configured to line up with a fastener hole 514 in the single rail 504 through which one of the fasteners 512 is passed. The second fastener hole 514 is configured to line up with a fastener hole 514 in one of the rails 504 in the parallel set of rails 504 through which the other fastener 512 is passed. The fastener 512 may be a rivet, a threaded cap screw and nut or other appropriate type of fastener. The fastener holes 514 are typically unthreaded but may be threaded. In some embodiments, each perpendicular rail splice 628 has two nut plates 626, one above the rails 504 and the other below.

Figure 5:
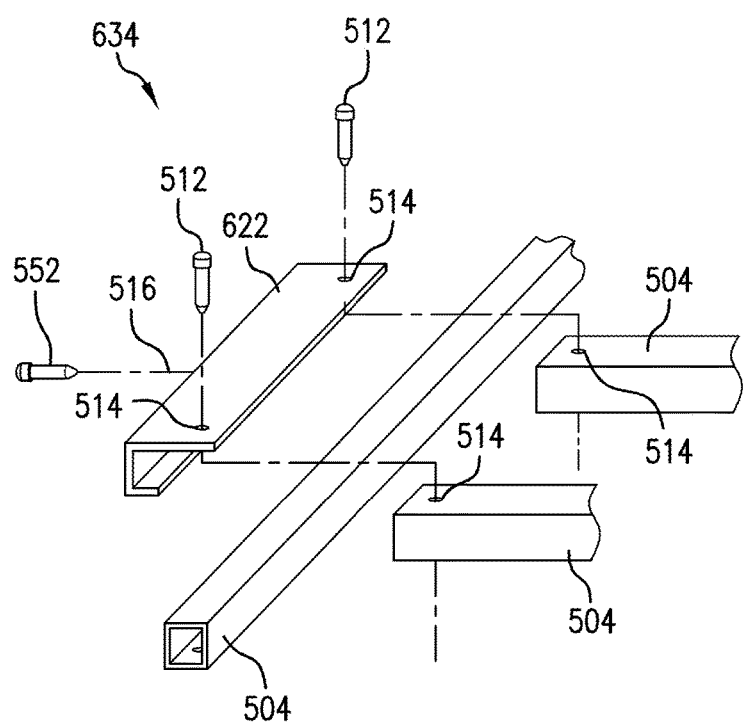
FIG. 5 shows an exploded perspective view of a clip splice.

FIG. 5 shows an exploded perspective view of a clip splice 634. The clip splice 634 connects a single rail 504 to a set of parallel rails 504 that are parallel to each other and perpendicular to the single rail 504. The clip splice 634 comprises a double-rail-to-single-rail clip 622 having a cross-sectional with three sides of a rectangle that allows the single rail 504 to nest therein with a sliding fit. The parallel rails 504 have fastener holes 514 near the ends closest to the double-rail-to-single-rail clip 622, which has two fastener holes 514 in a lip that overhangs the single bar 504 when the single rail 504 is nested within the double-rail-to-single-rail clip 622. With the double-rail-to-single-rail clip 622 clipped on to the single rail 504, two fasteners 512, such as a threaded screws, rivets or other fastening mechanisms pass through the two fastener holes 514 of the double-rail-to-single-rail clip 622 and the parallel rails 504, securing the parallel rails 504 to the single rail 504. The double-rail-to-single-rail clip 622 allows the parallel rails 504 to slide laterally relative to the single rail 504. In some embodiments, the clip splice 634 has a threaded hole 516 with a set screw 552 inserted therein. The set screw 552 can be tightened to engage the rail 504, holding the clip splice 634 in place on the single rail 504, or loosened to disengage from the single rail 504, allowing the clip splice 634 to slide along the single rail 504.

Figure 6:
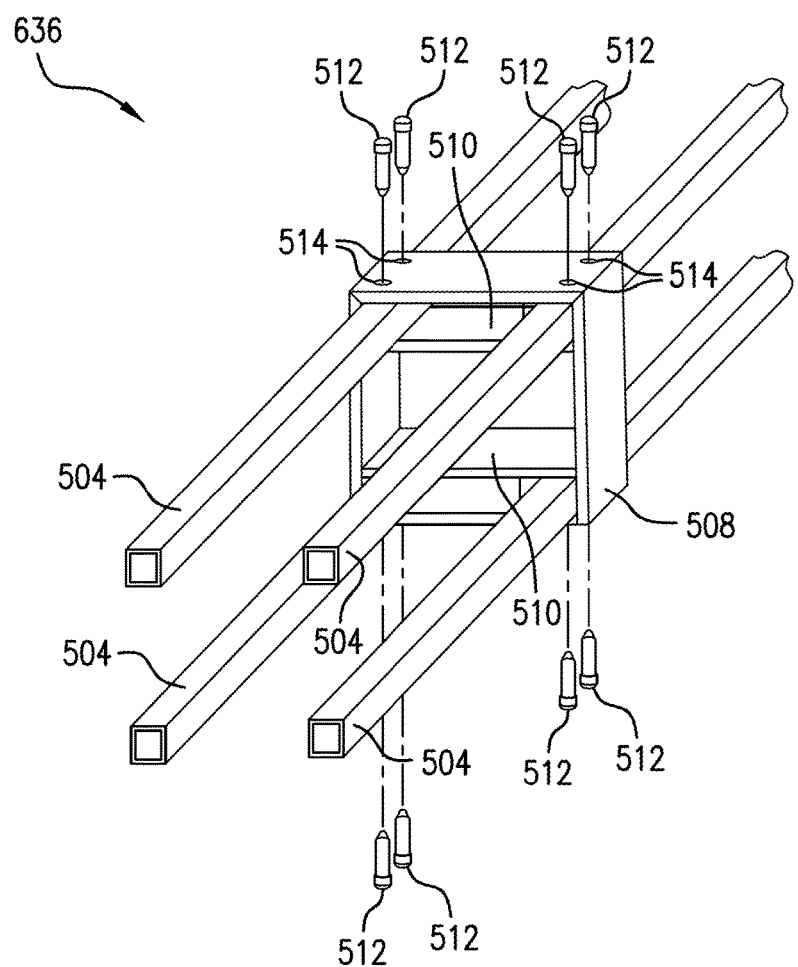
FIG. 6 shows a perspective view of a collar splice.

FIG. 6 shows a perspective view of a collar splice 636. The collar splice 636 is used to connect a first set of four rails 504 to a second set of four rails 504. The collar splice 636 is similar to the rail support bracket 508, but the fasteners 512 are in different places and the collar splice 636 has additional fasteners 512. Positioned near each corner of the collar splice 636 are two fastener holes 514. Fasteners 512 of the collar splice 636 pass through fastener holes 514 in the rail support bracket 508 and through fastener holes (not shown) in the ends of the first and second set of rails 504 and through a clamp plate 510. The fastener 512 may be a rivet, a threaded cap screw and nut or other appropriate type of fastener. The fastener holes 514 are typically unthreaded but may be threaded.

First Embodiment Workstation Module (H Module)

Figure 7A:
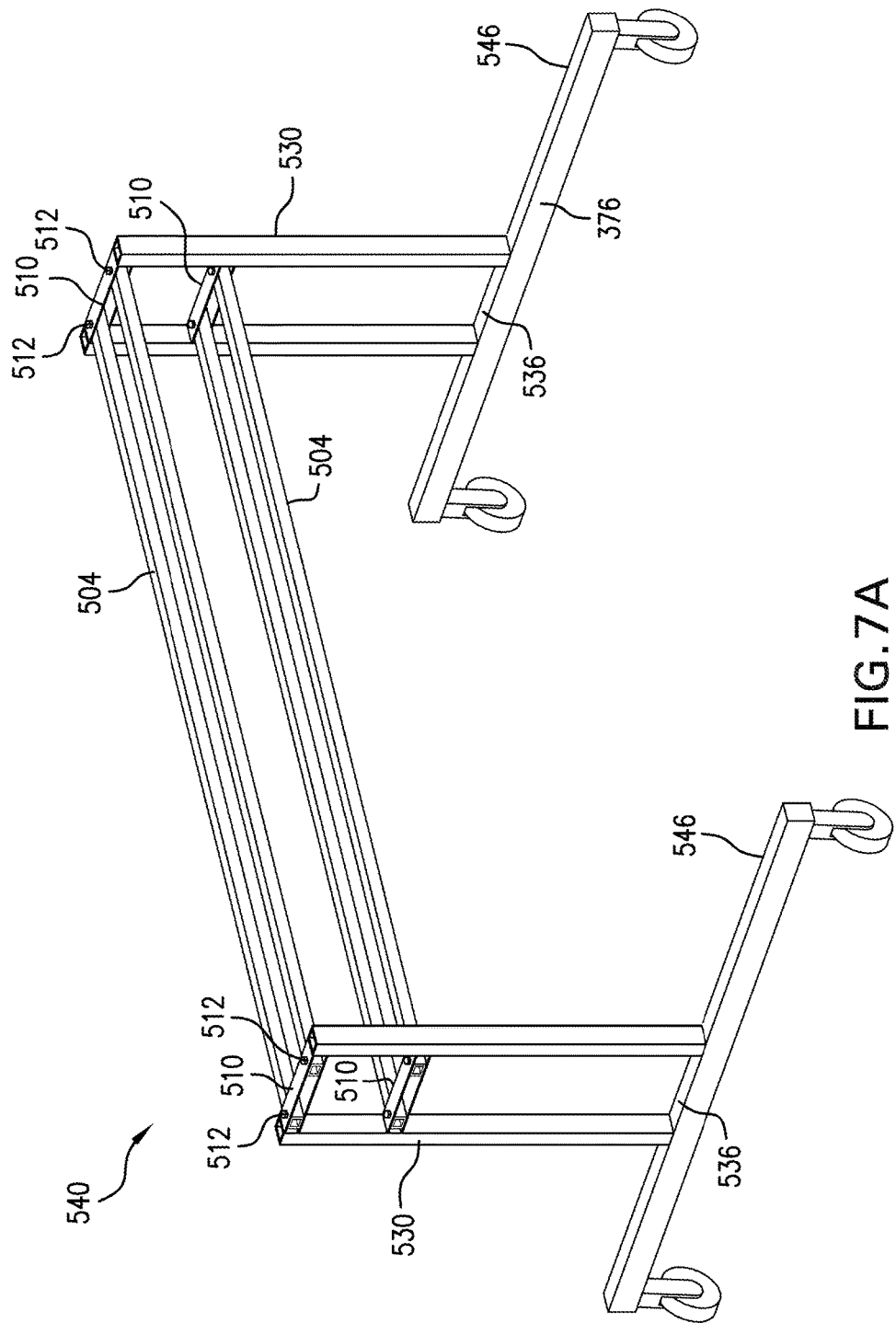

FIGS. 7A and 7B show a first embodiment of a workstation module 540, also referred herein as an H module. The H module 540 comprises two quad rail-arm-leg modules 530 and four rails 504. The rails 504 are secured to the quad rail-arm-leg modules 530 with cross plates 534 and fasteners 512 as described elsewhere herein. While the H module 540 may be freestanding without them, typically it has one or more sets of horizontal legs 546 to give it greater stability. The sets of horizontal legs 546 are coupled to the bottom of the open quad rail-arm-leg module 530. Typically, the horizontal legs 546 extend out horizontally to either side of the open quad rail-arm-leg module 530. The set of horizontal legs 546 typically has two vertical posts that are positioned and sized to slidingly insert into the bottom openings of the columns 532 of an open quad rail-arm-leg module 530, held in place by gravity, a set screw, or some other suitable mechanism. In other embodiments, the set of horizontal legs 546 is more permanently coupled to the open quad rail-arm-leg module 530 by welding, fasteners or other suitable mechanism.

The H module 540 has a cavity therein defined as an area between the inside corners of the four rails 504 and running a length of the four rails 504. The cavity contains no load bearing structure connecting the rails that runs for more than a total of a half of the length of the rails. This arrangement makes efficient use of mass since structure in the cavity will have little resistance to torque induced twist.

Second Embodiment Workstation Module (I Module)

Figure 8:
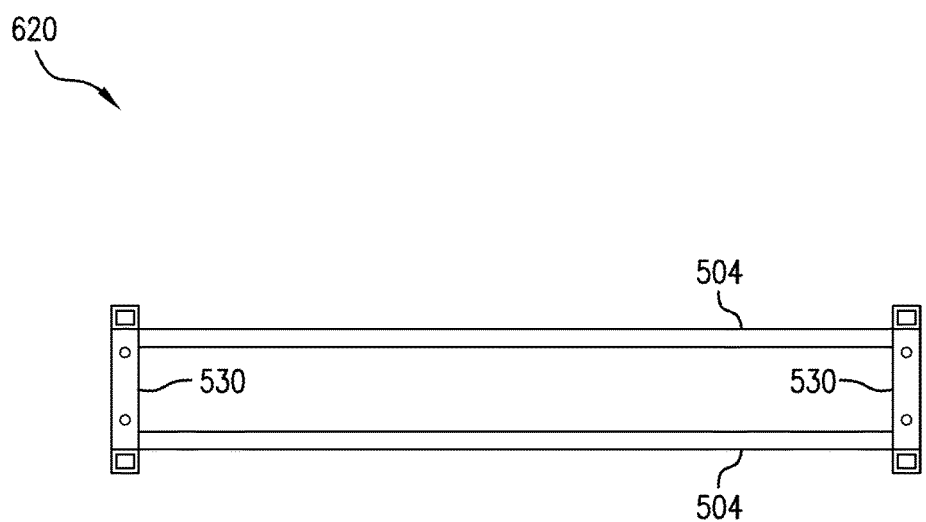
FIG. 8 shows an overhead view of a second embodiment of a workstation module (I module).

FIG. 8 shows an overhead view of a second embodiment of a workstation module 620 referred herein as an "I" module. The I module 620 comprises two quad rail-arm-leg modules 530 connected by set of four rails 504. It is similar to the H module 540, but without the horizontal legs 546. Without the horizontal leg 546, I module 540 does not have as much inherent stability, but is useful in situations where stability is provided by other means, such as by attaching the quad rail-arm-leg modules 530 of the I module 620 to a floor by bolts or other attachment mechanisms.

Third Embodiment Workstation Module (L Module)

Figure 9A:
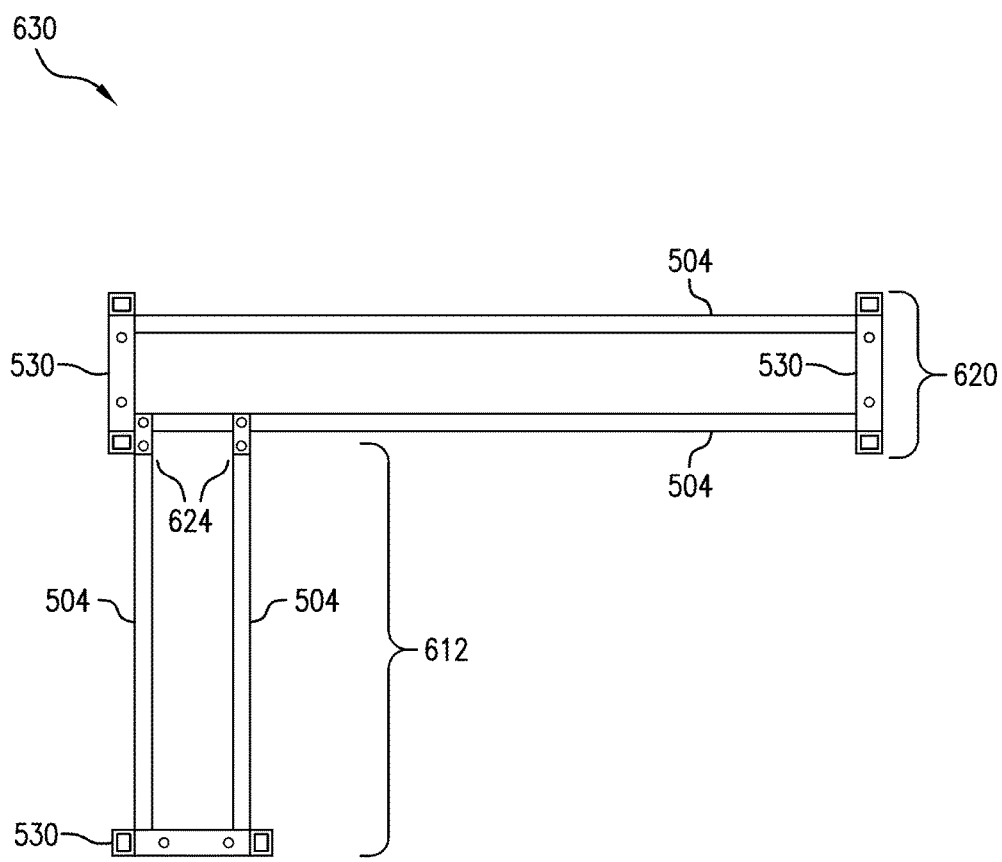
FIG. 9A shows an overhead view of a third embodiment of a workstation module (L module).

FIG. 9A shows an overhead view of a third embodiment of a workstation module 630 referred herein as an "L" module. The L module 630 comprises an I module 620 coupled with a truncated I module 612. The I module 620 portion of the L module 630 comprises two quad rail-arm-leg modules 530 connected by first set of four rails 504 The truncated I module 612 portion of the L module 630 comprises an open quad rail-arm-leg module 530 connected to a second set of rails 504 (typically four), essentially an I module 620 with one open quad rail-arm-leg module 530 removed. The rails 504 of the truncated I module 612 portion are connected to the rails 504 of the I module 620 portion by a plurality of perpendicular nut plate splices 628 such that the one of the rails 504 of the truncated I module 612 is adjacent or in contact with the one of the quad rail-arm-leg modules 530 of the I module 620 portion. Typically, two upper rails 504 of the truncated I module 612 are coupled to one of two upper rails 504 of the I module portion 620 and lower rails 504 of the truncated I module 612 are coupled to one of two lower rails 504 of the I module 620 directly below the upper rail 504 that is coupled to the truncated I module 612.

Figure 9B:
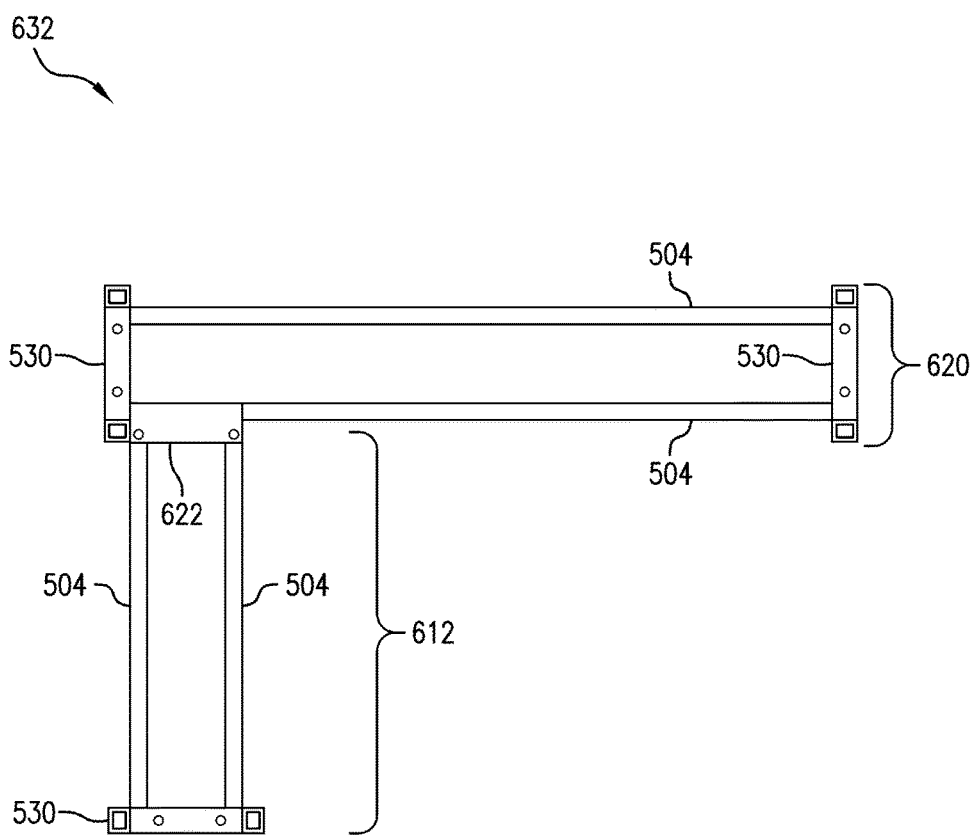
FIG. 9B shows an overhead view of an alternative third embodiment of a workstation module (alternative L module).

FIG. 9B shows an overhead view of an alternative version of the third embodiment of a workstation module 632

(alternative L module). In the alternative L module 632, the second set of rails (part of the truncated I module 612) is connected to the first set of rails 504 (part of the I module 620) by one or more clip splices 634 (typically two) instead of the plurality of perpendicular nut plate splices 628. The clip splice 634 may slide along the first set of rails 504 of the I module 620 portion of the L module 630.

Fourth Embodiment Workstation Module (T Module)

Figure 10A:
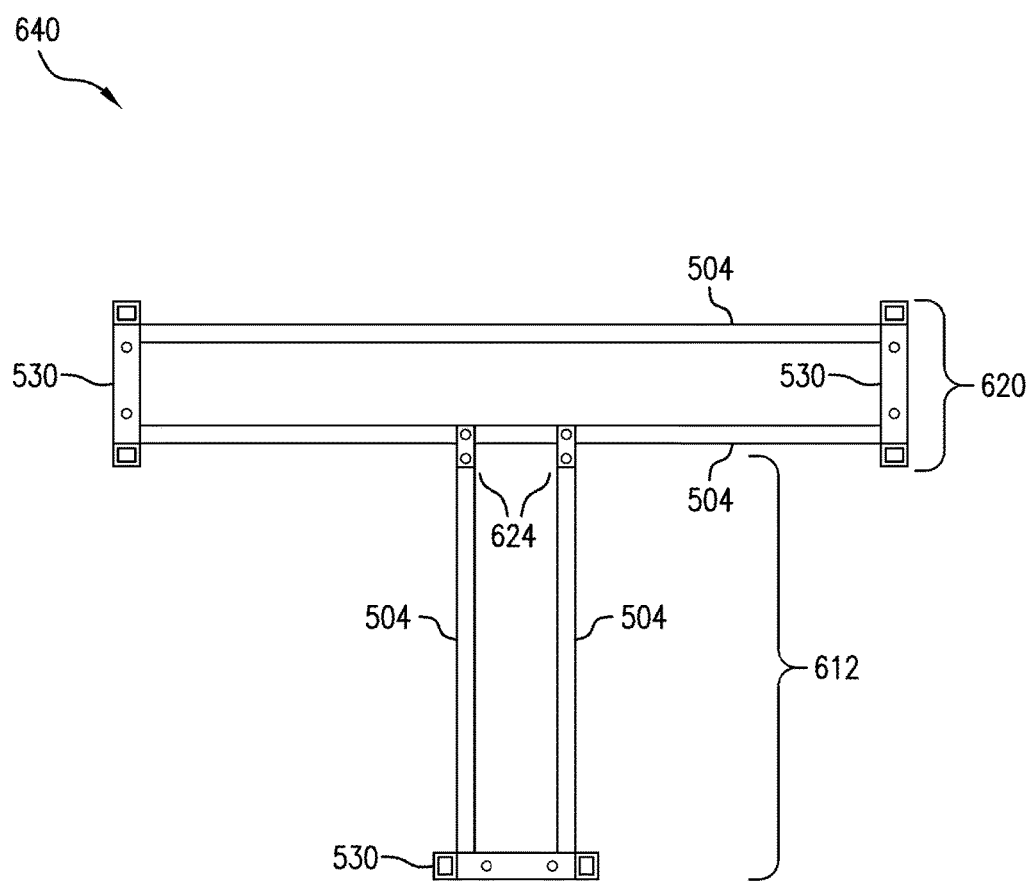
FIG. 10A shows an overhead view of a fourth embodiment of a workstation module (T module).

FIG. 10A shows an overhead view of a fourth embodiment of a workstation module 640 referred herein as a "T" module. The T module 640 is similar to the L module 630, but the second set of rails 504 (part of the truncated I module 612) are connected at or near the middle of the first set of rails 504 (part of the I module 620). In the T module 640, the second set of rails is coupled to the first set of rails with a plurality of perpendicular nut plate splices 628, typically four, one for each of the four rails 504 in the second set of rails 504.

Figure 10B:
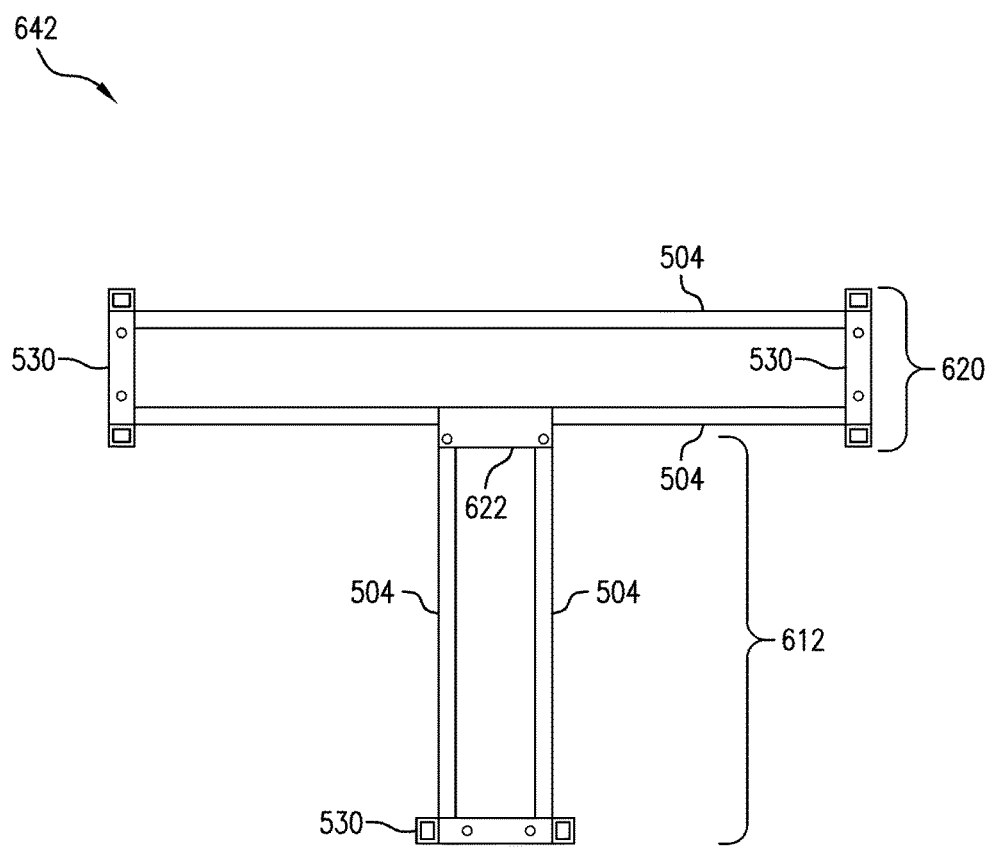
FIG. 10B shows an overhead view of an alternative version of the fourth embodiment of a workstation module (alternative T module).

FIG. 10B shows an overhead view of an alternative version of the fourth embodiment of a workstation module 642 (alternative T module). In the alternative T module 642, the second set of rails 504 (part of the truncated I module 612) is connected to the first set of rails 504 (part of the I module 620) by one or more double-rail-to-single-rail clips 622 (typically two) instead of the plurality of perpendicular nut plate splices 628. The double-rail-to-single-rail clips 622 may slide along the first set of rails 504.

Fifth Embodiment Workstation Module (X Module)

Figure 11A:
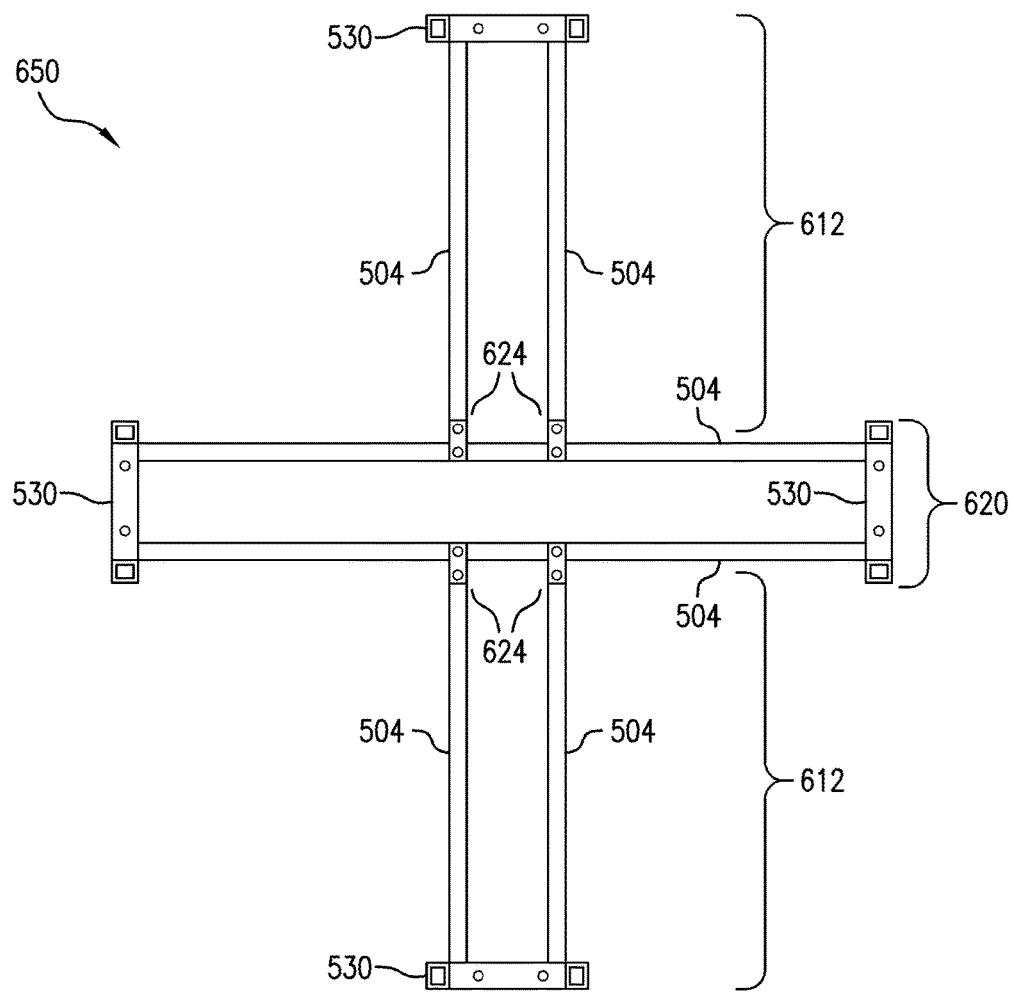
FIG. 11A shows an overhead view of a fifth embodiment of a workstation module (X module).

FIG. 11A shows an overhead view of a fifth embodiment of a workstation module 650 referred herein as an "X" module. The X module 650 is similar to the T module 640, but has a third set of rails 504 (part of a second truncated I module 612) that are connected to the first set of rails 504 (part of the I module 620) at or near the middle of the first set of rails 504 opposite the second set of rails 504. In the fifth embodiment workstation module 650, the third set of rails is coupled to the first set of rails with a plurality of perpendicular nut plate splices 628, typically four, one for each of the four rail 504s in the third set of rails 504.

Figure 11B:
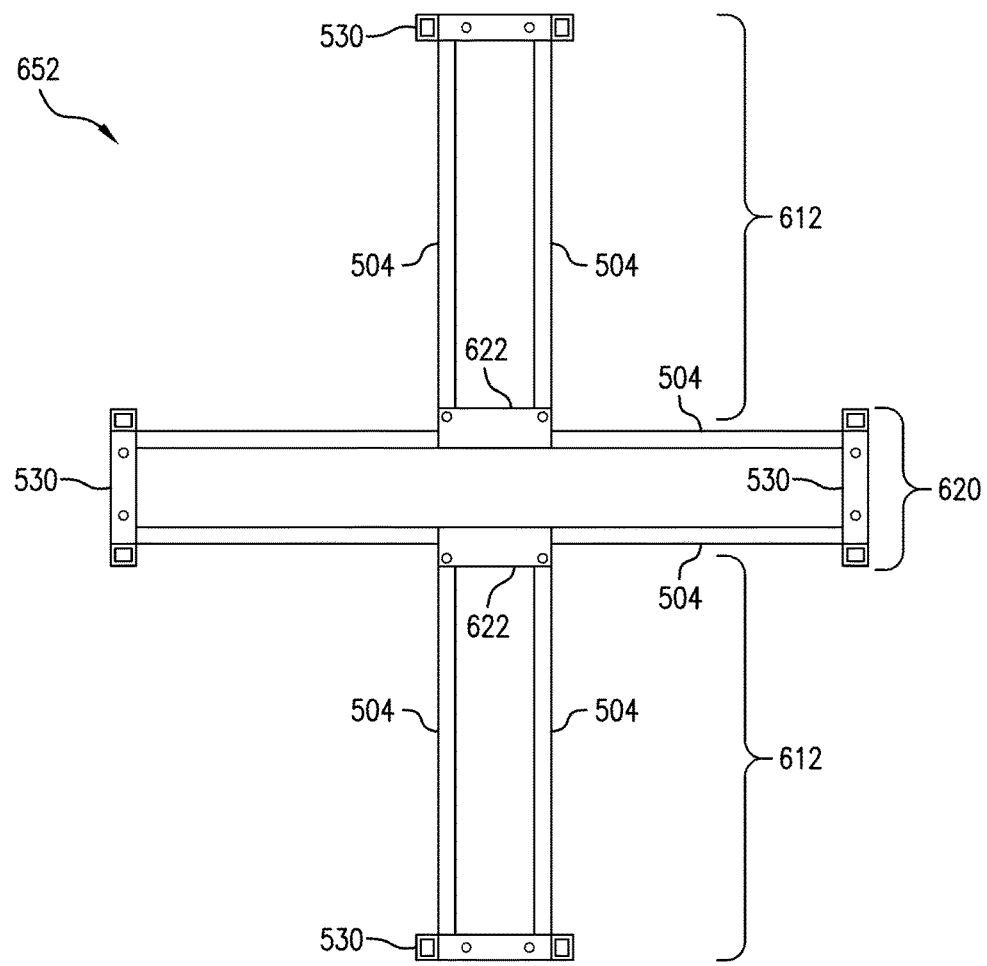
FIG. 11B shows an overhead view of an alternative version of the fifth embodiment workstation module (alternative X module).

FIG. 11B shows an overhead view of an alternative version of the fifth embodiment workstation module 652 (alternative X module). In the alternative X module 652, the third set of rails 504 (part of a second truncated I module 612) is connected to the first set of rails 504 (part of the I module 620) by one or more double-rail-to-single-rail clips 622 (typically two) instead of the plurality of perpendicular nut plate splices 628. The double-rail-to-single-rail clips 622 may slide along the first set of rails 504.

Sixth Embodiment Workstation Module (Y Module)

Figure 12:
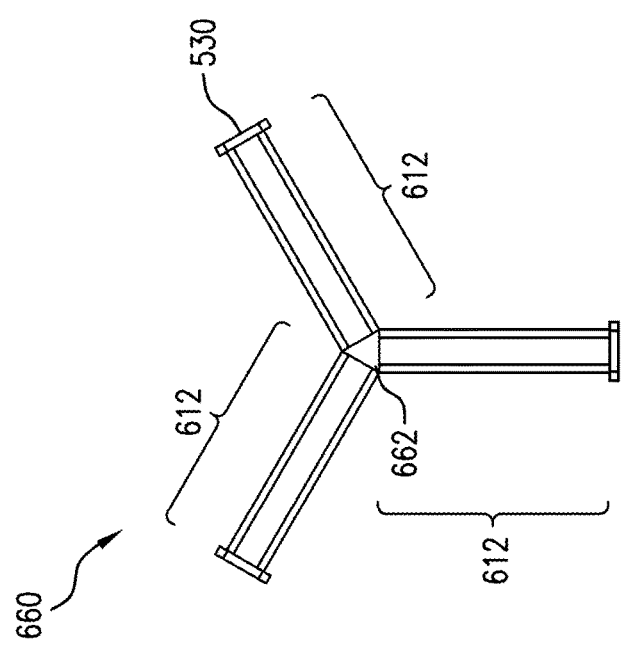
FIG. 12 shows an overhead view of a sixth embodiment of a workstation module (Y module).

FIG. 12 shows an overhead view of a sixth embodiment of a workstation module 660 referred herein as a "Y" module. The Y module 660 comprises three truncated I modules 612 coupled to two Y module center couplers 662. Each Y module center couplers 662 comprises three rails 504 coupled together, typically by welding, but in some embodiments by threaded fasteners or other suitable coupling mechanism. In some embodiments, the three rails 504 of the Y module center coupler 662 are forged as a single monolithic piece. The rails 504 of the truncated I modules 612 couple to the Y module center couplers 662 with perpendicular nut plate splices 628 or clip splices 634.

Seventh Embodiment Workstation Module (Pentagon Module)

Figure 13:
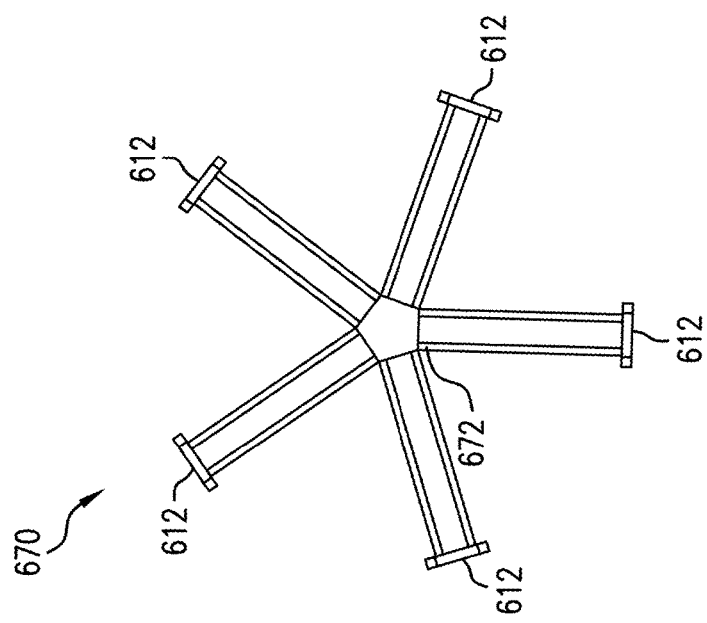
FIG. 13 shows a seventh embodiment of a workstation module ("pentagon" module).

FIG. 13 shows a seventh embodiment of a workstation module 670 referred herein as a "pentagon" module. The pentagon module 670 comprises five truncated I modules 612 coupled to two pentagon module center couplers 672. Each pentagon module center coupler 672 comprises five rails 504 coupled together, typically by welding, but in some embodiments by threaded fasteners or other suitable coupling mechanism. In some embodiments, the five rails 504 of the pentagon module center coupler 672 are forged as a single monolithic piece. The rails 504 of the truncated I modules 612 couple to the pentagon module center coupler 672 with perpendicular nut plate splices 628 or clip splices 634.

Twin Rail-Arm-Leg (RAL) Module

Figure 29:
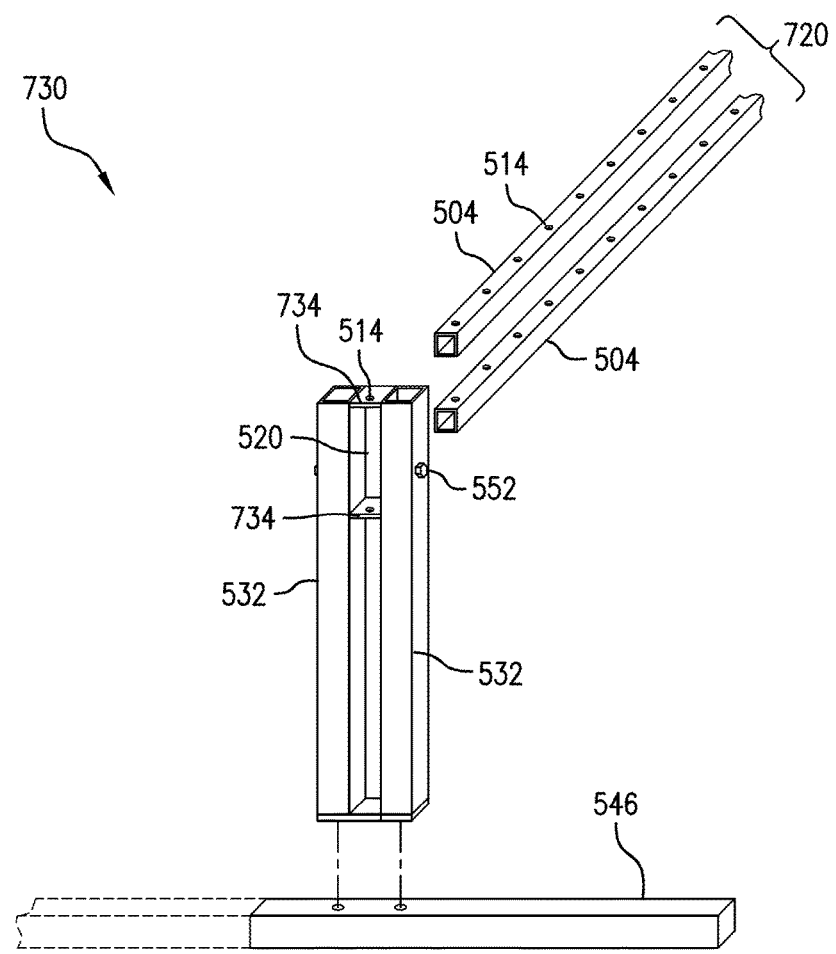
FIG. 29 shows a representative embodiment of a twin rail-arm-leg module.

Another substructure for use with the Three-Dimensional Positioning and Holding Modular System is a twin rail-arm-leg (RAL) module 730. FIG. 29 shows a representative embodiment of a twin rail-arm-leg module 730. The twin rail-arm-leg module 730 is similar to the open quad rail-arm-leg module 530, but is configured to hold two rails 504, one above the other to form a twin rail beam 720, rather than four rails 504 in a rectangular pattern forming a quad-rail beam 500. The twin rail-arm-leg module 730 comprises two columns 532 coupled by two cross plates 734 and a bottom plate 736. The columns 532 are orthogonal from the cross plates 734 and the bottom plate 736, with the two columns 532 arranged vertically in parallel. The two cross plates 734 and the bottom plate 736 are arranged horizontally in parallel. The columns 732 and the cross plates 734 define a module interior configured for receiving the two rails 504. In the representative embodiment, the module interior is slightly wider than a rail 504, providing a sliding fit, but in other embodiments, the module interior may be wider and a looser fit may be provided. The columns 532, the cross plates 734, and the bottom plate 736 are typically made of metal, such as steel, and coupled by welding, but may be made of other suitable materials and joined by other methods. The columns 532 in the twin rail-arm-leg module 730 are essentially identical to the columns 532 in the open quad rail-arm-leg module 530. The two cross plates 734 each have a fastener hole 514. The fastener holes 514 are typically unthreaded, but in some embodiments, may be threaded.

The rails 504 for use with the twin rail-arm-leg module 730 have fastener holes 514 spaced at periodic distances along the rail 504. The fastener holes 514 in the rails 504 are typically unthreaded, but in some embodiments, may be threaded.

The twin rail-arm-leg module 730 is configured to combine with the rails 504 to make work stations of various configurations. The twin rail-arm-leg module 730 is configured for two rails 504 to be inserted into the interior space of the twin rail-arm-leg module 730. One rail 504 is attached to the underside of the upper cross plate 734 with a fastener passing through the fastener holes 514 in the rail 504 and the upper cross plate 734. The other rail 504 is attached to the topside of the lower cross plate 734 with a fastener passing through the fastener holes 514 in the rail 504 and the lower cross plate 734.

While not having as much resistance to torque induced twist as the open quad rail-arm-leg module 530, the twin rail beam 720 still provides a good amount of torque resistance due to the space between the rails 504. The twin rail beam 720 is configured so that between the two rails there is a gap that is at least as large as a largest cross-sectional dimension of one of the two rails. This is to ensure that the rails 504 are far enough apart to give the twin rail beam 720 good resistance to torsional twisting.

The typical dimensions for the twin rail-arm-leg module 730 are 20 inches high and 3¾ inches wide across the front. The interior space of the twin rail-arm-leg module 730 is typically 1¼ inches wide between the columns 532, 6 inches between the two cross plates 534, and 1½ inches deep. These dimensions are convenient for building industrial workstations, but other dimensions may be used. The cross plate 734 nearest the top of the twin rail-arm-leg module 730 is typically flush with the top of the columns 532, but in some embodiments, may be positioned lower. The fastener holes 514 are ⅜-inch diameter and on the rail 504 have 2 inch spacing.

While twin rail-arm-leg module 730 may be freestanding, typically it has one or more horizontal legs 546 to give it greater stability. The horizontal legs 546 are coupled to the bottom of the twin rail-arm-leg module 730 by welding, fasteners or other suitable mechanism.

Figure 30:
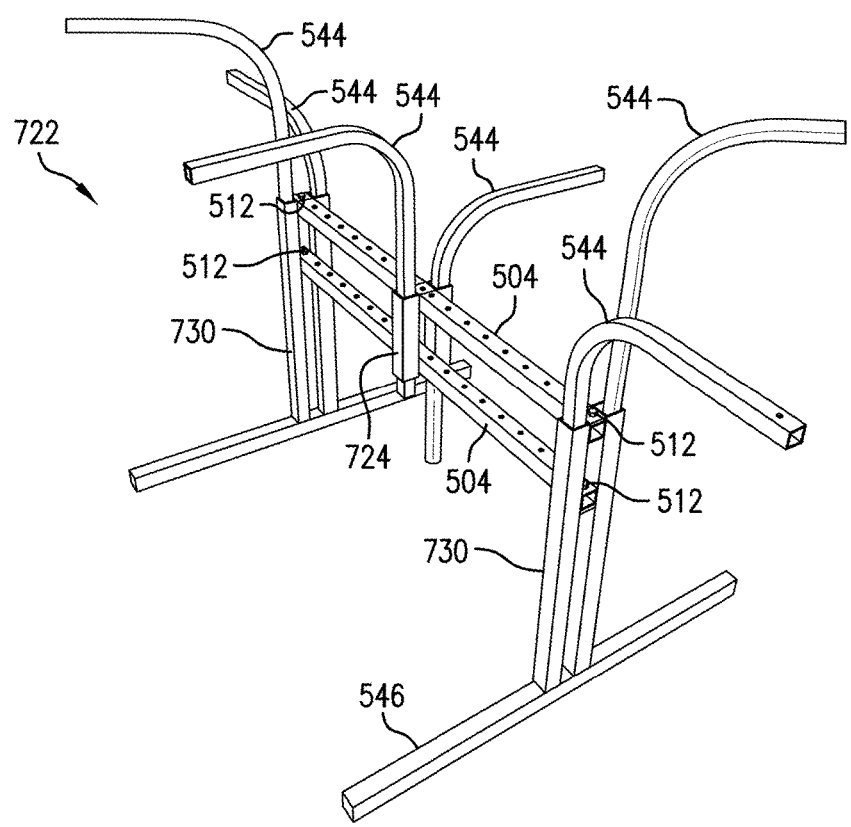
FIG. 30 shows a perspective view of a twin rail H module with a double drop-on rail clip bracket.

The twin rail-arm-leg module 730 may be used to make any of workstation embodiments based on the open quad rail-arm-leg module 530 described herein, the necessary changes being made, including the H module 540, the I module 620, the L module 630, the T module 640, the X module 650, the Y module 660, and the pentagon module 670. FIG. 30 shows a twin rail H module 722 with a double drop-on rail clip bracket 724 clipped on to the rails 504 of the twin rail H module 722. FIG. 31A shows a side view of a twin rail H module with arms 544, single-arm table support bracket 562, and table tops 568 attached. FIG. 31B shows a side view of a double drop-on rail clip bracket 724 with arms 544, single-arm table support bracket 562, and table tops 568 attached.

Split Quad Rail-Arm-Leg (RAL) Module

Figure 32:
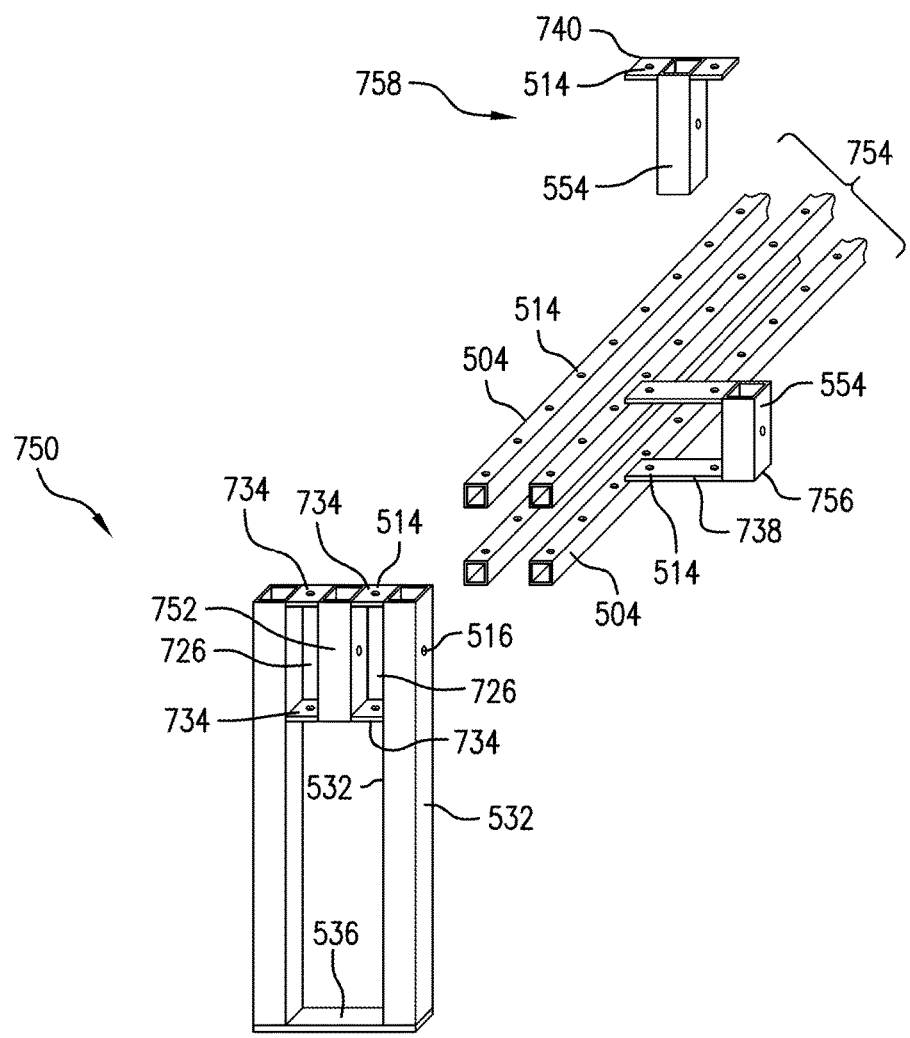
FIG. 32 shows a representative embodiment of a split quad rail-arm-leg module.

Another substructure for use with the Three-Dimensional Positioning and Holding Modular System is a split quad rail-arm-leg module 750. FIG. 32 shows a representative embodiment of a split quad rail-arm-leg module 750. The split quad rail-arm-leg module 750 is similar to the open quad rail-arm-leg module 530, but the module interior is split by a center column 752. The split quad rail-arm-leg module 750 comprises two columns 532 on either side coupled a bottom plate 736. Two cross plates 734, an upper and a lower, couple one of the columns 532 to the center column 752 and two more cross plates 734 couple the other column 532 to the center column 752. The columns 532 are orthogonal from the cross plates 734 and the bottom plate 736, with the two columns 532 on the sides and the center column 752 arranged vertically in parallel. The two cross plates 734 and the bottom plate 736 are arranged horizontally in parallel. The center column 752 has an open top and is similar in construction to the columns 732 on the sides of the split quad rail-arm-leg module 750. The center column 752 extends between the cross plates 734 in the exemplary embodiment, but in other embodiments, may extend to the bottom plate 736. The columns 732 and the cross plates 734 define a module interior 520 divided in two partial module interiors 726 by the center column 752 with each partial module interior 726 configured for receiving two rails 504. In the representative embodiment, each partial module interior 726 is slightly wider than a rail 504, providing a sliding fit between the column 532 and the center column 752, but in other embodiments, each partial module interior 726 may be wider and a looser fit may be provided. The columns 532, the cross plates 734, and the bottom plate 736 are typically made of metal, such as steel, and coupled by welding, but may be made of other suitable materials and joined by other methods. The columns 532 in the split quad rail-arm-leg module 750 are essentially identical to the columns 532 in the open quad rail-arm-leg module 530. The four cross plates 734 each have a fastener hole 514. The fastener holes 514 are typically unthreaded, but in some embodiments, may be threaded.

The rails 504 for use with the twin rail-arm-leg module 730 have fastener holes 514 spaced at periodic distances along the rail 504 like the rails 504 used with the twin rail-arm-leg module 730, but arranged in a second exemplary embodiment quad-rail beam 754 similar to the first exemplary embodiment quad-rail beam 500.

The split quad rail-arm-leg module 750 is configured to combine with the rails 504 to make work stations of various configurations. The split quad rail-arm-leg module 750 is configured for two rails 504 to be inserted into each of two partial module interiors 726 of the twin rail-arm-leg module 730. In each partial module interior 726 one rail 504 is attached to the underside of the upper cross plate 734 with a fastener passing through the fastener holes 514 in the rail 504 and the upper cross plate 734 and the other rail 504 is attached to the topside of the lower cross plate 734 with a fastener passing through the fastener holes 514 in the rail 504 and the lower cross plate 734.

The typical dimensions for the split quad rail-arm-leg module 750 are 20 inches high and 8½ inches wide across the front. Each partial module interior 726 of the twin rail-arm-leg module 730 is typically 1¼ inches wide between the column 532 and the center column 752, 6 inches between the two cross plates 534, and 1½ inches deep. These dimensions are convenient for building industrial workstations, but other dimensions may be used. The cross plates 734 nearest the top of the twin rail-arm-leg module 730 are typically flush with the top of the columns 532, but in some embodiments, may be positioned lower. While split quad rail-arm-leg module 750 may be freestanding, typically it has one or more horizontal legs (not shown) to give it greater stability.

The split quad rail-arm-leg module 750 may be used to make any of workstation embodiments based on the open quad rail-arm-leg module 530 described herein, the necessary changes being made, including the H module 540, the I module 620, the L module 630, the T module 640, the X module 650, the Y module 660, and the pentagon module 670.

Arms and Positioning Holders

The Three-Dimensional Positioning and Holding Modular System includes positioning holders for holding workstation accessories such as table tops, lighting fixtures, cabinets, tool holders, computer monitors, etc. Positioning holders for use with the Three-Dimensional Positioning and Holding Modular System are configured for attaching to rails 504 or modules (e. g. an open quad rail-arm-leg module 530). The positioning holders typically are configured to allow repositioning of the accessory and in some cases, of the positioning holder itself. Some of the positioning holders hold accessories directly, but most do so indirectly though arms 544 that attach directly to the positioning holder. Objects are attached by bolting, pinning, clamping, telescoping, clipping (plastics), wedging or nesting.

The arms 544 in the Three-Dimensional Positioning and Holding Modular System are shaped and sized to have a sliding fit when inserted into the top opening of the columns 532 (or 752) of any of the rail-arm-leg modules (e.g. 530, 730, 750) or any the positioning holders as described herein. The arms 544 typically have a rectangular cross-section, but may have a circular cross-section, or a cross-section of some other shape. Once inserted and in a desired position, an arm 544 is held in that position with a set screw 552 (See e.g. FIG. 16) engaged with a threaded hole 516 in the rail support arm bracket 542 or open quad rail-arm-leg module 530. Alternative embodiments may have other suitable mechanisms for locking the arm 544 in position.

Figure 14:
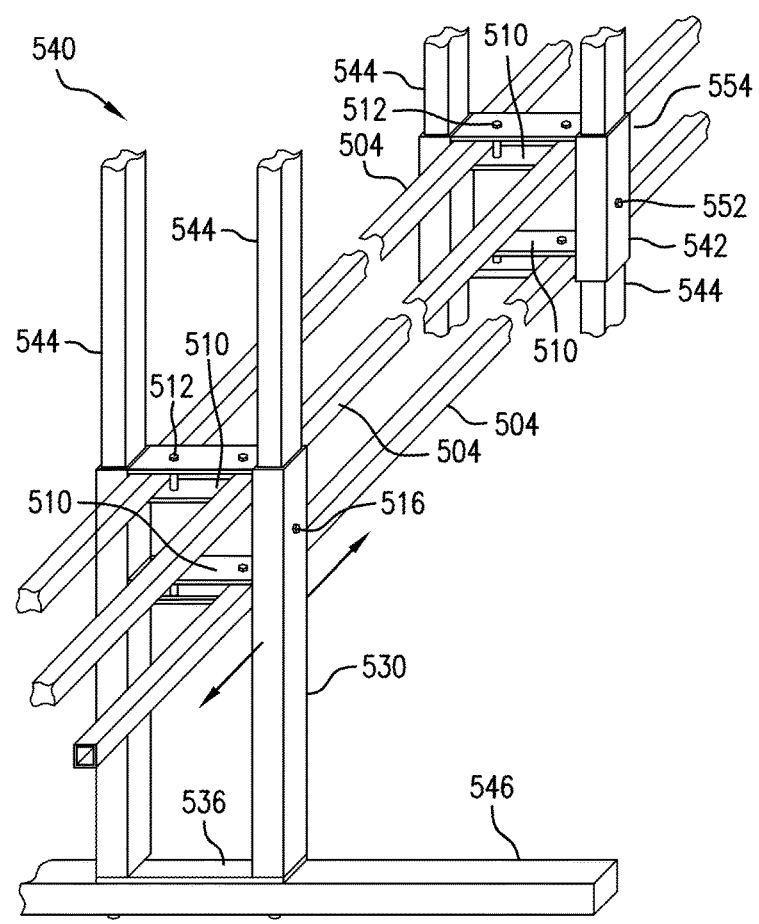
FIG. 14 shows part of a first embodiment workstation module with arms attached and a rail support arm bracket.

FIG. 14 shows a rail support arm bracket 542 attached to the rails 504 of a quad-rail beam 500 with arms 544 inserted into the rail support arm bracket 542 and into open ends of the columns 532 of a quad rail-arm-leg module 530. The rail support arm bracket 542 has a function similar to that of the rail support bracket 508, providing support to the rails 504, but additionally has the function of providing attachment points for arms 544. The top and bottom of the rails and arm support bracket 542 have fastener holes 514 for fasteners 512 to pass through, as in the rail support bracket 508, but the sides are arm tubes 554, shaped and sized to provide a sliding fit with the arms 544 to be used with them. Once inserted and in a desired position, an arm 544 is held in that position with a set screw 552 turned into a threaded hole in the side of the rail support arm bracket 542. Alternative embodiments may have other suitable mechanisms for locking the arm 544 in position. The rail support arm bracket 542 may be used at a part of the H module 540 where arms are desired, but horizontal legs 546 are not.

Figure 15A:
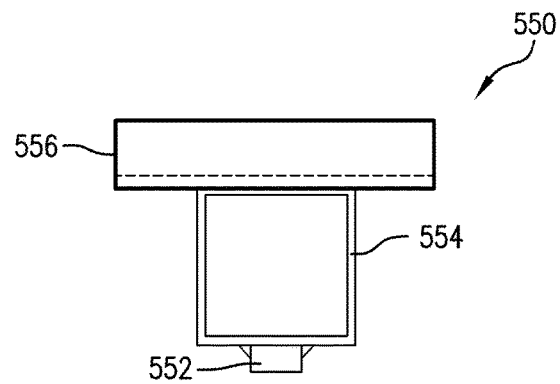
FIGS. 15A, 15B, and 15C respectively show top, front, and side views of a side mount clamp-on arm bracket.
Figures 15B, 15C:
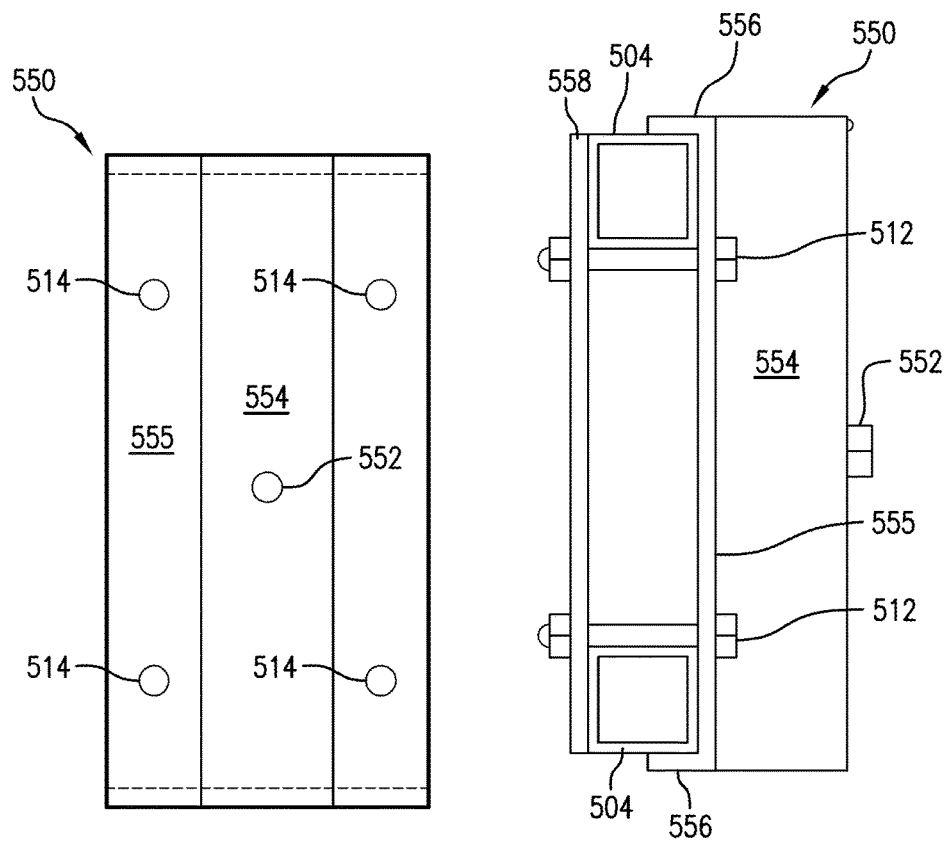

A side mount clamp-on arm bracket 550 is another positioning holder for use with the Three-Dimensional Positioning and Holding Modular System. FIGS. 15A, 15B, and 15C respectively show top, front, and side views of a side mount clamp-on arm bracket 550. The side mount clamp-on arm bracket 550 comprises an arm tube 554 coupled to an arm bracket plate 555. The arm bracket plate 555 is configured to clamp onto two rails 504 of a quad-rail beam 500, a twin rail beam 720, and has two arm bracket lips 556 that are sized and positioned to match the distance across the rails and hold the side mount clamp-on arm bracket 550 onto the rails 504. The arm bracket plate 555 has a plurality of fastener holes 514. Fasteners 512 may pass to these fastener holes 514 and through matching fastener holes 514 in a clamp plate 558 to secure the side mount clamp-on arm bracket 550 to the rails 504. The arm tube 554 is shaped and sized to provide a sliding fit to the arms 544 to be used with it. The arm tube 554 has a set screw 552 coupled thereto, which is configured to hold in position an arm 544 that has been inserted into the arm tube 554.

Figure 16:
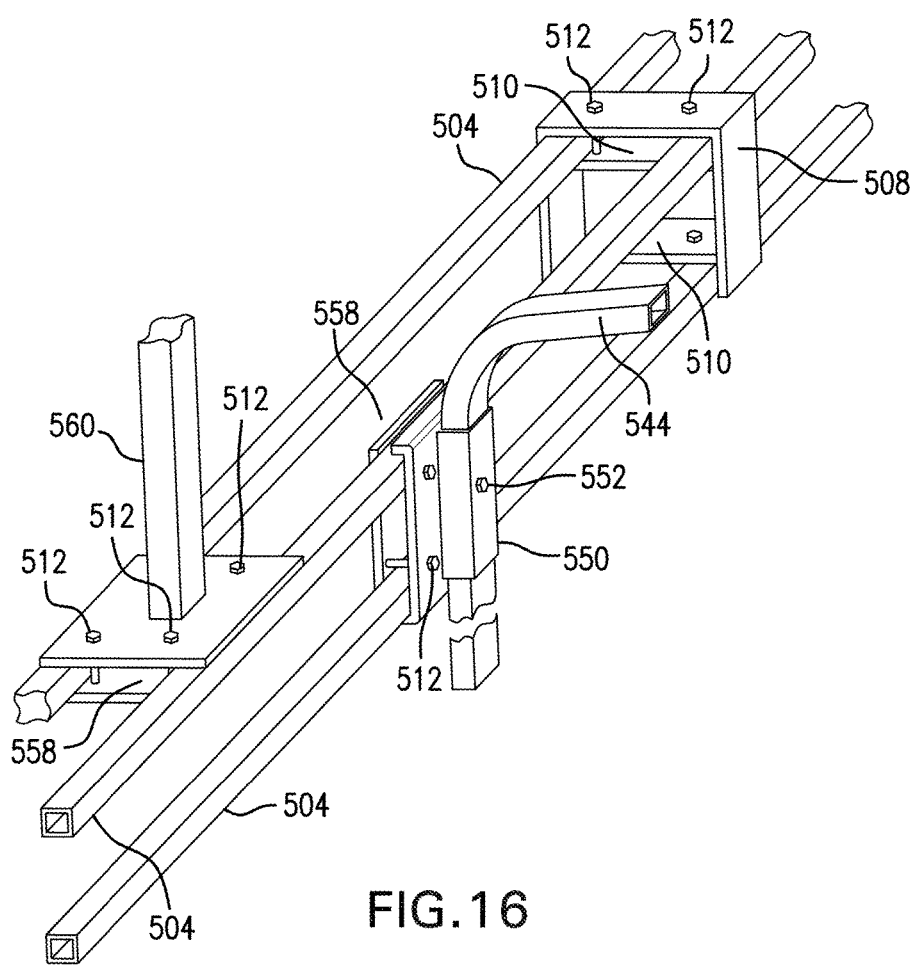
FIG. 16 shows various brackets for use with the first representative embodiment quad-rail beam or first embodiment workstation module.

FIG. 16 shows various positioning holders, including the side mount clamp-on arm bracket 550 and the rail support bracket 508, discussed elsewhere herein, and a top mount clamp-on arm bracket 560 for use with one of the quad-rail beams. The top mount clamp-on arm bracket 560 is configured to attach to the top side of two rails 504 with a clamp plate 558. The top mount clamp-on arm bracket 560 is intended to support work station accessories computer monitors, tool holders, light fixtures, etc. The top mount clamp-on arm bracket 560 may have a solid bar extending up from the clamp plate or may have an arm tube 554 extending up from the clamp plate.

Figure 17:
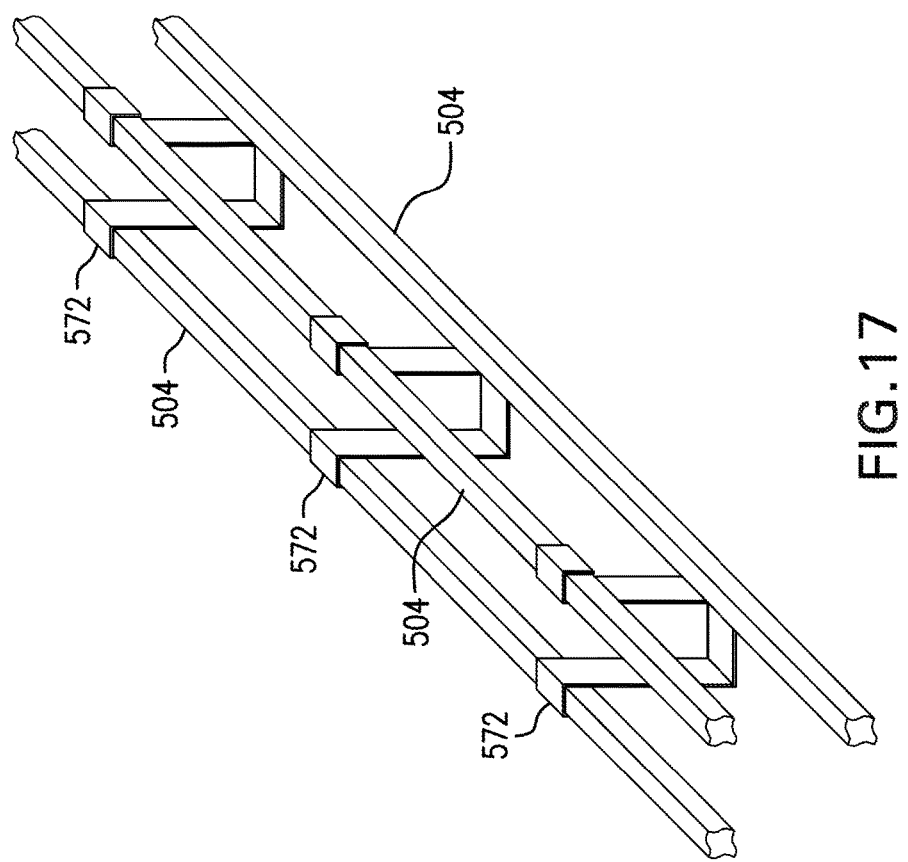
FIG. 17 shows quad rail cable cradles for use with the quad-rail beam or the workstation module.

A quad rail cable cradle 572 is another type of positioning holder for use with the Three-Dimensional Positioning and Holding Modular System. FIG. 17 shows several quad rail cable cradles 572 attached to the top two rails 504 of a quad-rail beam 500 or one of the workstation module embodiments. The quad rail cable cradles 572 insert between the rails 504 clip onto the rails 504. Typically, a quad rail cable cradle 572 has a sliding fit on the rails 504 and is held in place primarily by gravity, but other quad rail cable cradles 572 may have a tighter fit to hold them in place. Power and communications cables may be run to workstation accessories using the quad rail cable cradles 572.

Figure 18:
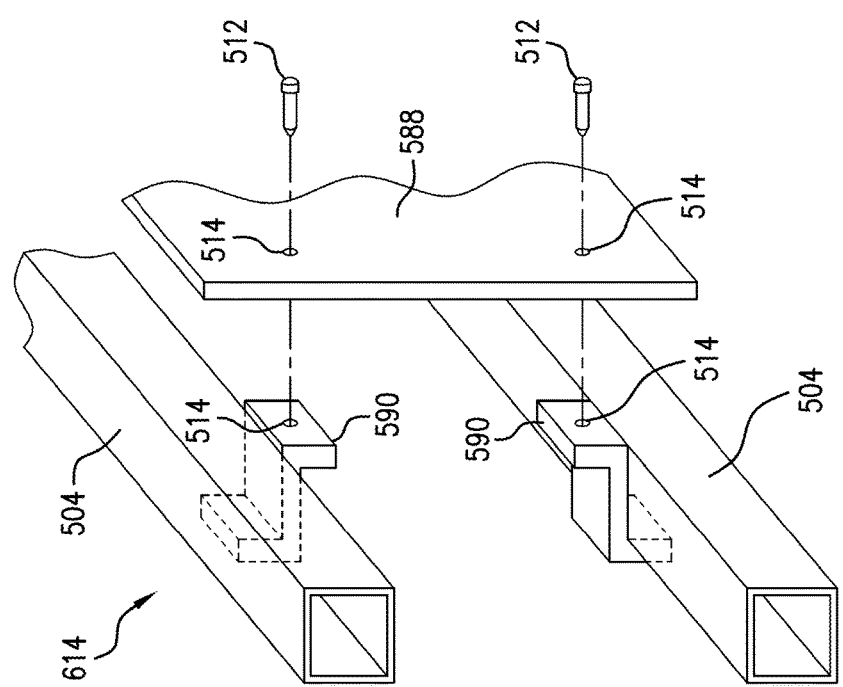
FIG. 18 shows an S clip mounting.

An S clip mounting 614 is another type of positioning holder for use with the Three-Dimensional Positioning and Holding Modular System. FIG. 18 shows an S clip mounting 614 comprising two S clips 590 and a rail mount plate 588. The two S clips 590 each have a fastener hole 514 and the rail mount plate 588 has two corresponding fastener holes 514 positioned within the rail mount plate 588. When S clips 590 are position on opposing surfaces of two parallel rails 504 of a quad-rail beam 500, a twin rail beam 720 or one of the workstation modules, the fastener holes 514 of the rail mount plate 588 line up with the fastener holes 514 of the S clips 590. A fastener 512 is passed through each of the fastener holes 514 of the rail mount plate 588 and through the fastener hole 514 of the corresponding S clip 590. The S clips 590 and the rail mount plate 588 pinch the two parallel rails 504 between them, holding the s clip mounting 614 securely in place. The rail mount plate 588 may have accessories attached directly thereto, or indirectly via other positioning holders attached to the rail mount plate 588. The fastener 512 may be a rivet, a threaded cap screw and nut or other appropriate type of fastener. The fastener holes 514 are typically unthreaded but may be threaded.

Figure 19:
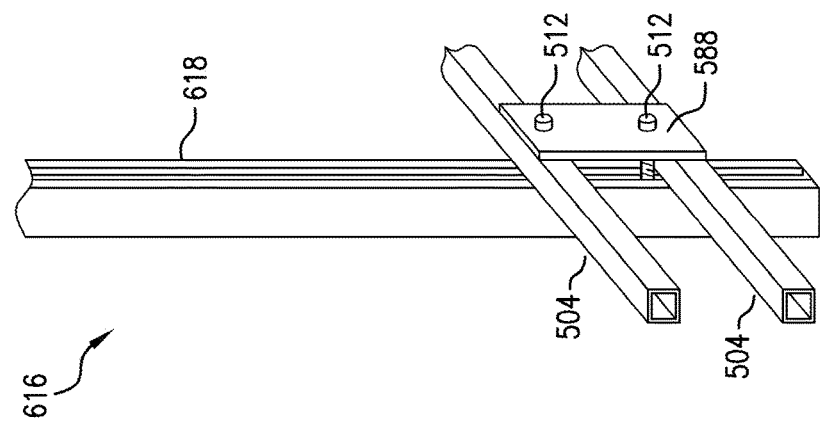
FIG. 19 shows a channel-to-rail mounting.

A channel-to-rail mounting 616 is another type of positioning holder for use with the Three-Dimensional Positioning and Holding Modular System. FIG. 19 shows a channel-to-rail mounting 616 comprising a channel bar 618 and a rail mount plate 588. Two fastener holes 514 positioned within the rail mount plate 588 such that when two fasteners 512 are passed through the two fastener holes 514, the two fasteners 512 contact opposing surfaces of two parallel rails 504 of a quad-rail beam 500, a twin rail beam 720 or one of the workstation modules. The fasteners 512, which are threaded, engage with a strut-nut within the channel of the channel bar 618. The channel bar 618 and the rail mount plate 588 pinch the two parallel rails 504 between them, holding the channel-to-rail mounting 616 securely in place. The rail mount plate 588 may have accessories attached directly thereto, or indirectly via other positioning holders attached to the rail mount plate 588.

Figure 20:
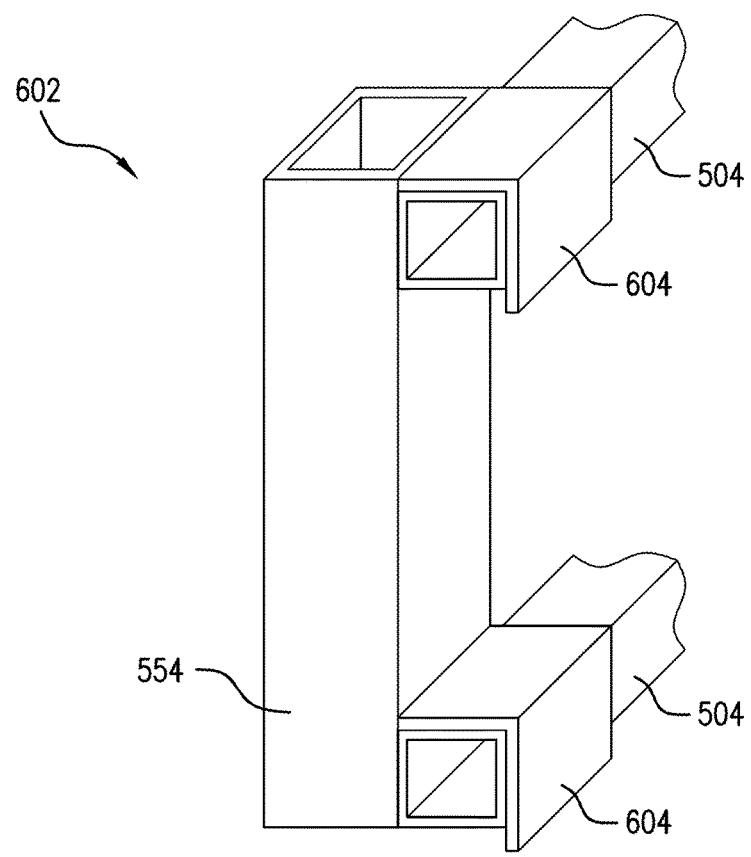
FIG. 20 shows a single drop-on rail clip bracket.

A single drop-on rail clip bracket 602 is another type of positioning holder for use with the Three-Dimensional Positioning and Holding Modular System. FIG. 20 shows a single drop-on rail clip bracket 602 comprising an arm tube 554 coupled with two tube nesting brackets 604. Each tube nesting bracket 604 comprises two plates coupled at right angles. The single drop-on rail clip bracket 602 is configured so that it can be dropped onto a set of two parallel rails 504 of a quad-rail beam 500, one rail 504 positioned over the other rail 504. Each of the two rails 504 enters a space created between one of the two tube nesting brackets 604 and the arm tube 554 with a sliding fit (or looser). Each tube nesting bracket 604 rests on the top of its respective rail 504. The single drop-on rail clip bracket 602 is held in place by gravity alone, although in some alternative embodiments, one or both of the tube nesting brackets 604 has a threaded fastener hole and set screw to hold the single drop-on rail clip bracket 602 in place. The single drop-on rail clip bracket 602 function and purpose is similar to that of the side mount clamp-on arm bracket 550 (See FIGS. 15A-15C), but with a different way of mounting to the rails 504. The arm tube 554 is shaped and sized to provide a sliding fit to the arms 544 to be used with it. The arm tube 554 may have a threaded fastener hole with a set screw, which is configured to hold in position an arm 544 that has been inserted into the arm tube 554. The single drop-on rail clip bracket 602 may also be configured so that it can be dropped onto the two parallel rails 504 of a twin rail beam 720. In which case, the single drop-on rail clip bracket 602 may have fastener holes 514 in the tube nesting bracket 604 to match up with the fastener holes 514 in the rails 504 of the twin rail beam 720, allowing a fastener to pass through and couple the single drop-on rail clip bracket 602 to the rails 504.

Figure 21A:
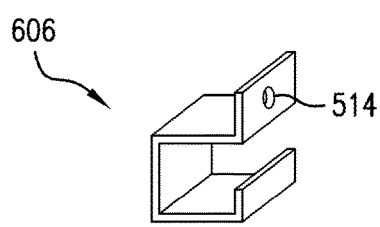
FIG. 21A shows a perspective view of a single rail single fastener clip.
Figure 21B:
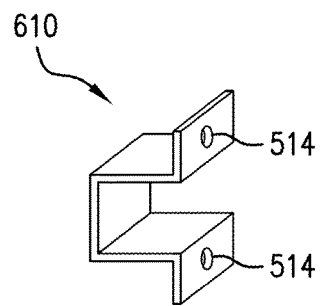
FIG. 21B show a perspective view of a single rail double fastener clip.
Figure 22A:
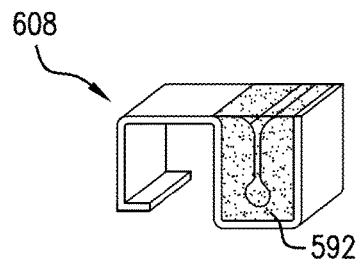
FIG. 22A shows a perspective view of a single rail wire holding clip.
Figure 22B:
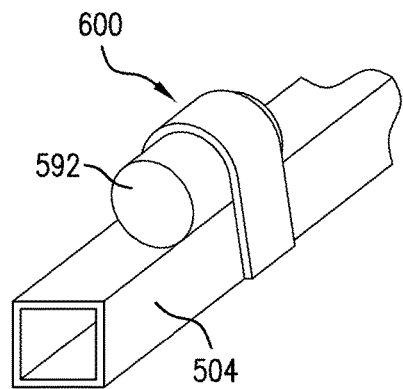
FIG. 22B which shows a perspective view of a Velcro strip holding a service cable to a rail.
Figure 23:
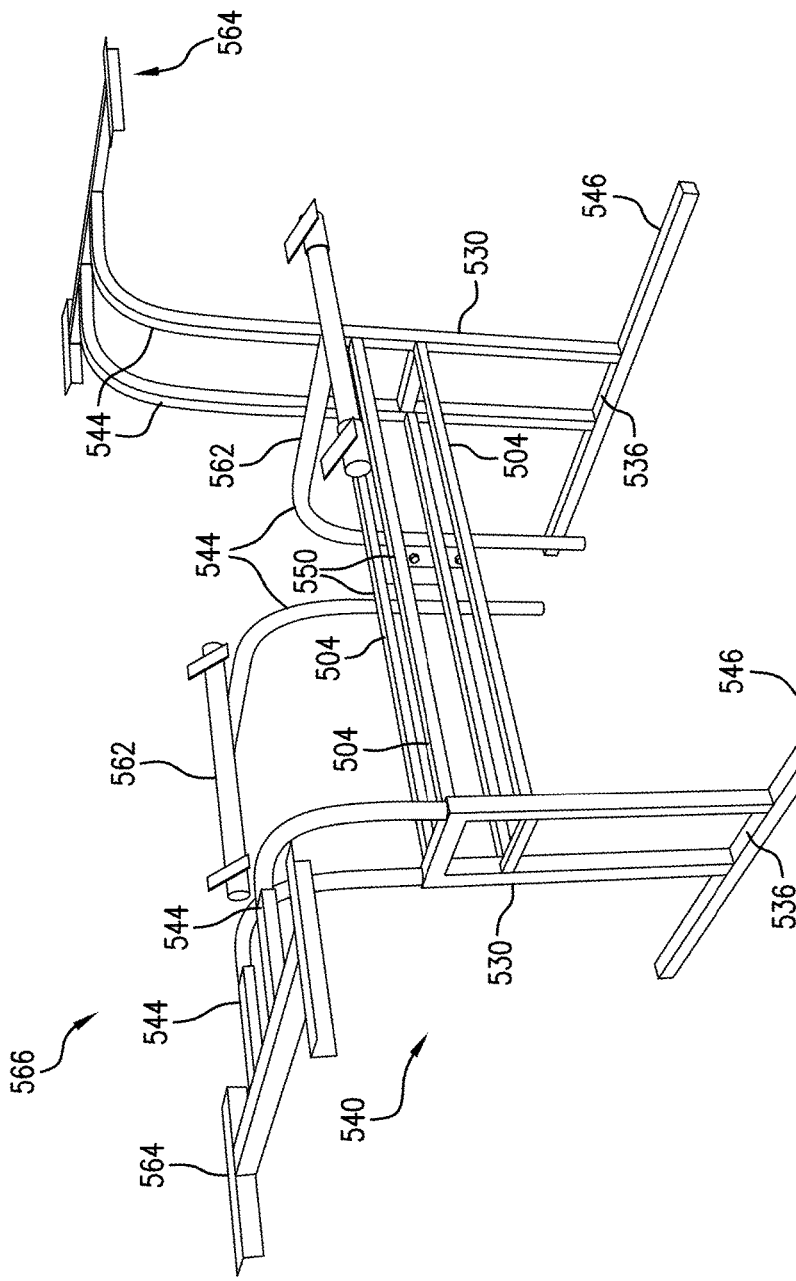
FIG. 23 shows a perspective view of a first representative workstation arrangement based on a first embodiment workstation module.

FIGS. 21-23 show several single rail holders. FIG. 21A shows a perspective view of a single rail single fastener clip 606. The single rail single fastener clip 606 is configured to clip onto a single rail 504. The single rail single fastener clip 606 has a tab with a fastener hole 514 to which may be attached a small workstation accessory. The single rail single fastener clip 606 is configured as a short three-sided rectangular tube, with a lip that on the fourth side. The single rail single fastener clip 606 is slightly larger than the rails 504 to which it is designed to clip around with a tight fit. The single rail single fastener clip 606 is made of a flexible, elastic material, typically plastic, that allows the opening on the fourth side to expand enough for the lip to pass around the rail 504, then snap back when the rail 504 is fully nested in the single rail single fastener clip 606 with the lip preventing the single rail single fastener clip 606 from slipping off the rail 504. FIG. 21B show a perspective view of a single rail double fastener clip 610. The single rail double fastener clip 610 is similar to the single rail single fastener clip 606, but does not have a lip on the fourth side, which instead is completely open. The single rail double fastener clip 610 has an additional tab with a fastener hole 514. To prevent the single rail double fastener clip 610 from slipping off the rail 504, the single rail double fastener clip 610 relies on the accessory attaching to both fastener holes 514 with fasteners.

FIG. 22A shows a perspective view of a single rail wire holding clip 608. The single rail wire holding clip 608 is similar to the single rail single fastener clip 606 except instead of the tab with the fastener hole 514, the single rail wire holding clip 608 has a trough with cable retaining material 594. The intended use for the single rail wire holding clip 608 is to clip to a rail 504 in a workstation and guide cables for power or communications. An alternative way to guide cables is shown in FIG. 22B which shows a perspective view of a Velcro strip 600 holding a service cable 592 to a rail 504.

A double drop-on rail clip bracket 724 is another type of positioning holder for use with the Three-Dimensional Positioning and Holding Modular System. FIG. 30 shows a double drop-on rail clip bracket 724 clipped on to the rails 504 of a twin rail H module 722. The double drop-on rail clip bracket 724 comprises two arm tubes 554 coupled by a single bolt plate 740 a single fastener hole 514. The double drop-on rail clip bracket 724 is configured to drop on to the twin rail beam 720 with a sliding fit. The double drop-on rail clip bracket 724 is coupled to the twin rail beam 720 with a single fastener that passes through the fastener hole 514 in the bolt plate 740 of the double drop-on rail clip bracket 724 and through the fastener hole 514 of a top rail 504 of the twin rail beam 720.

A top mount bolt-on arm bracket 758 is another type of positioning holder for use with the Three-Dimensional Positioning and Holding Modular System. FIG. 32 shows a top mount bolt-on arm bracket 758 that has an arm tube 554 coupled to two bolt plates 740. The bolt plates 740 each have a single fastener hole 514. The fastener hole 514 of one of the two bolt plates 740 is configured to line up with a fastener hole 514 in one of the upper rails 504 of a second embodiment quad-rail beam 754 and the fastener hole 514 of the other of the two bolt plates 740 is configured to line up with a fastener hole 514 in the other of the upper rails 504 of a second embodiment quad-rail beam 754. Once so aligned, fasteners may be passed through the fastener hole 514 to couple the top mount bolt-on arm bracket 758 to the rails 504.

A side mount bolt-on arm bracket 756 is another type of positioning holder for use with the Three-Dimensional Positioning and Holding Modular System. FIG. 32 shows a side mount bolt-on arm bracket 756 that is similar to the side mount clamp-on arm bracket 550 (see FIG. 16). The side mount bolt-on arm bracket 756 has an arm tube 554 and two bolt plates 738 for coupling with the rails 504 of a second embodiment quad-rail beam 754. The bolt plates 738 each have two fastener holes 514 that are configured to line up with the fastener holes 514 in the rails 504 of a second embodiment quad-rail beam 754, the fastener holes 514 in the upper bolt plate 738 lining up with the fastener holes 514 in the upper two rails 504, and the fastener holes 514 in the lower bolt plate 738 lining up with the fastener holes 514 in the lower two rails 504. Once so aligned, fasteners may be passed through the fastener hole 514 to couple the side mount bolt-on arm bracket 756 to the rails 504. Some side mount bolt-on arm bracket 756 may be configured for coupling with the rails 504 of a twin rail beam 720, with shorter bolt plates 738, each with only a single fastener hole 514.

Workstation Arrangements Based on the Workstation Modules

FIG. 23 shows a perspective view of a first representative workstation arrangement 566 based on a first embodiment workstation module (H module) 540, which in turn may be based on the open quad rail-arm-leg module 530 or twin rail-arm-leg module 730. The workstation arrangement 566 comprises a H module 540 with two double-arm table support brackets 564 and two single-arm table support brackets 562. Tables are omitted in FIG. 23 to better show the underlying structure of the workstation arrangement 566. Each of the two double-arm table support brackets 564 is coupled to two arms 544, which insert into the columns 532 of one of the two quad rail-arm-leg modules 530 of the H module 540. Each of the single-arm table support brackets 562 is coupled to an arm 544, which is inserted into a side mount clamp-on arm bracket 550 mounted to two of the four rails 504.

Figure 24:
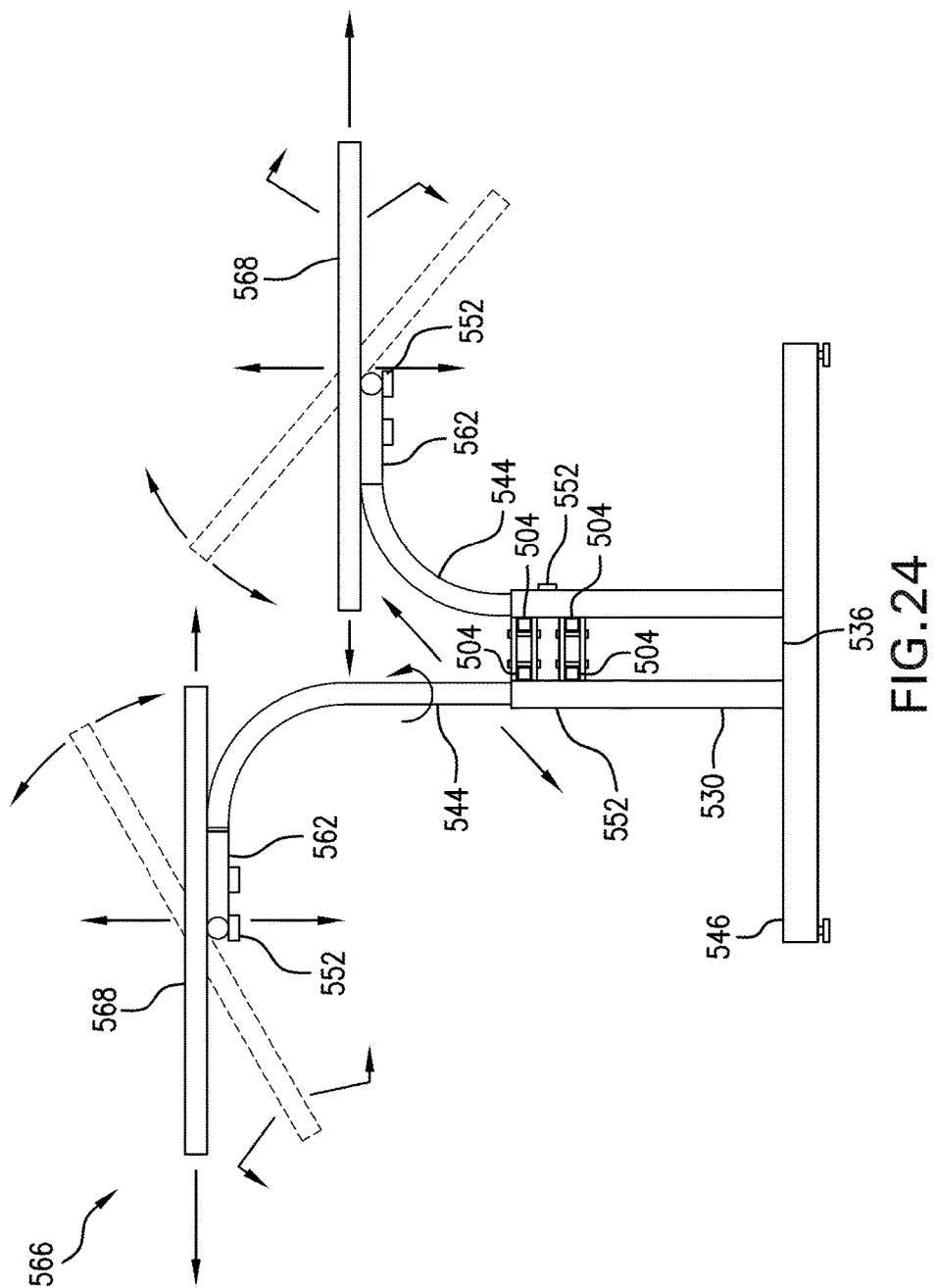
FIG. 24 shows a side view of the first representative workstation arrangement based on a first embodiment workstation module.

FIG. 24 shows a side view of the first representative workstation arrangement 566 based on a first embodiment workstation module (H module) 540. The double-arm table support bracket 564 are not shown to better illustrate the operation of the single-arm table support brackets 562. Table tops 568 are coupled to the single-arm table support brackets 562. The single-arm table support brackets 562 are configured to allow the table tops 568 to tilt to a desired work position. The tilt and height of each table top 568 can be adjusted independently and locked in a desired position with the set screws 552 on the single-arm table support bracket 562 and side mount clamp-on arm bracket 550 respectively.

Figure 25:
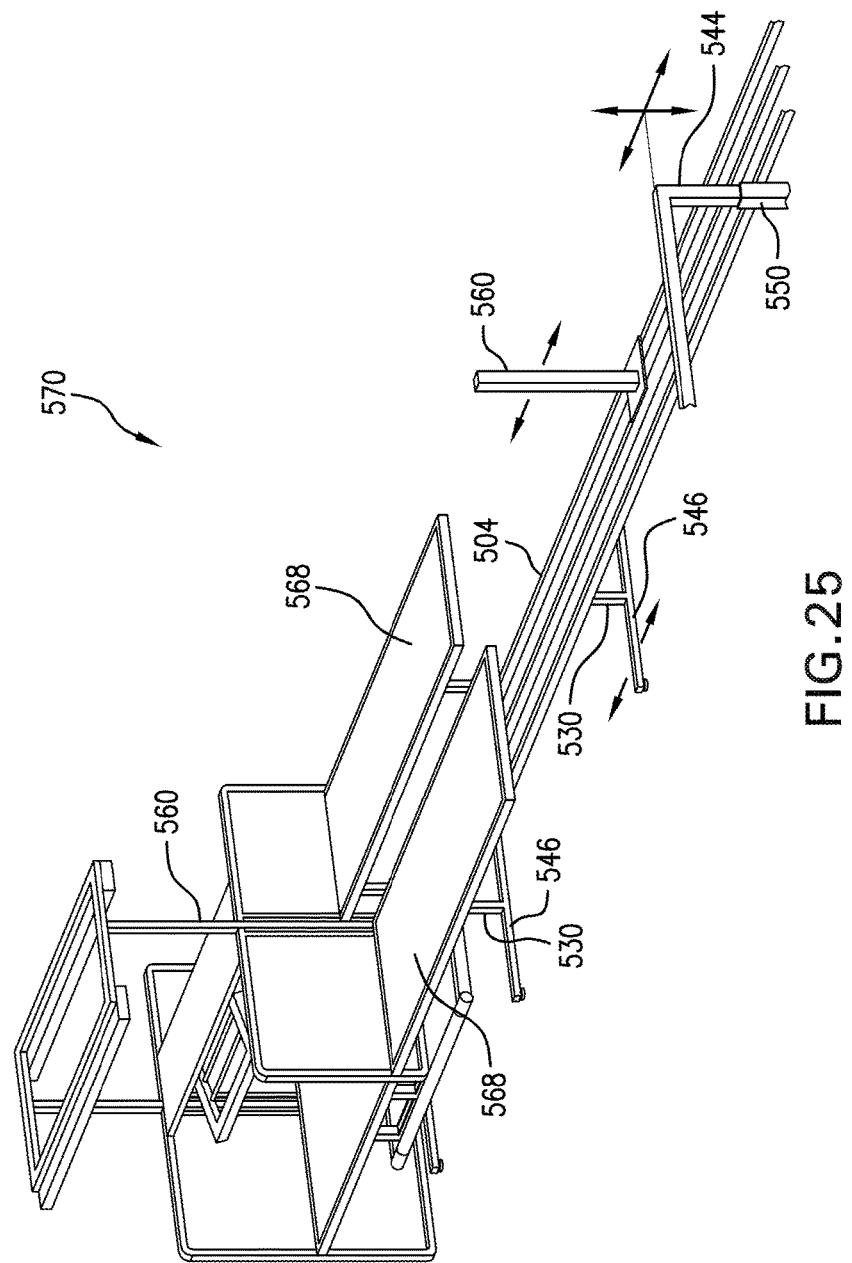
FIG. 25 shows a perspective view of a second representative workstation arrangement based on a first embodiment workstation module.

FIG. 25 shows a perspective view of a second representative workstation arrangement 570 based on a first embodiment workstation module (H module) 540 with various positioning holders. This second embodiment workstation arrangement 570 has multiple first embodiment rail-arm-leg assemblies 540 connected in series. Quad rail-arm-leg modules 530 are used to splice different sections of rails 504.

Figure 26:
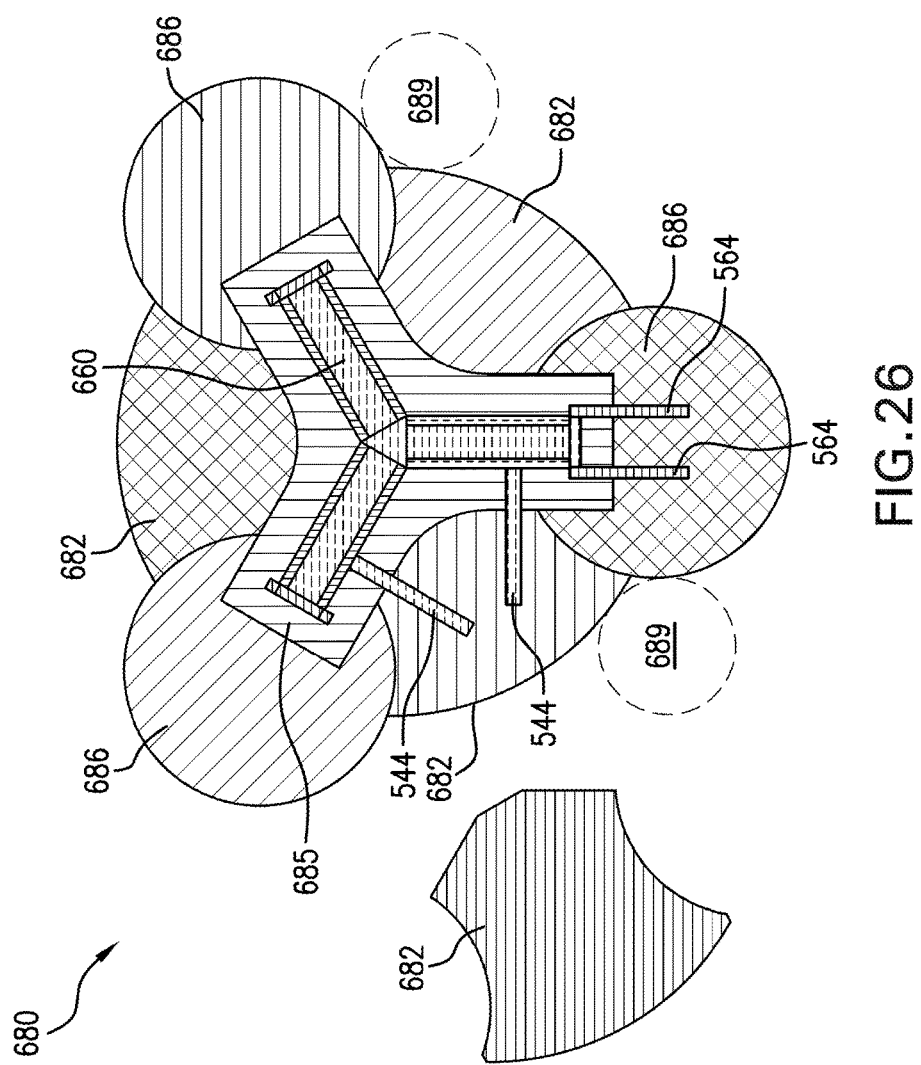
FIG. 26 shows a perspective view of a third embodiment workstation arrangement based on the sixth embodiment workstation module (Y module).

FIG. 26 shows a perspective view of a third embodiment workstation arrangement 680 based on the sixth embodiment workstation module 660 (Y module). A Y-shaped table top 685 is positioned over and coupled to the Y module 660 with a plurality of arms 544 and double-arm table support bracket 564. Three circular table top 686 are attached at the end of each point of the Y module 660 on double-arm table support brackets 564. Three Y module interstitial table tops 682 are attached on arms 544 between the Y-shaped table top 685 and the three circular table tops 686. The locations of two stools 689 are shown as they may be used with third embodiment workstation arrangement 680.

Figure 27:
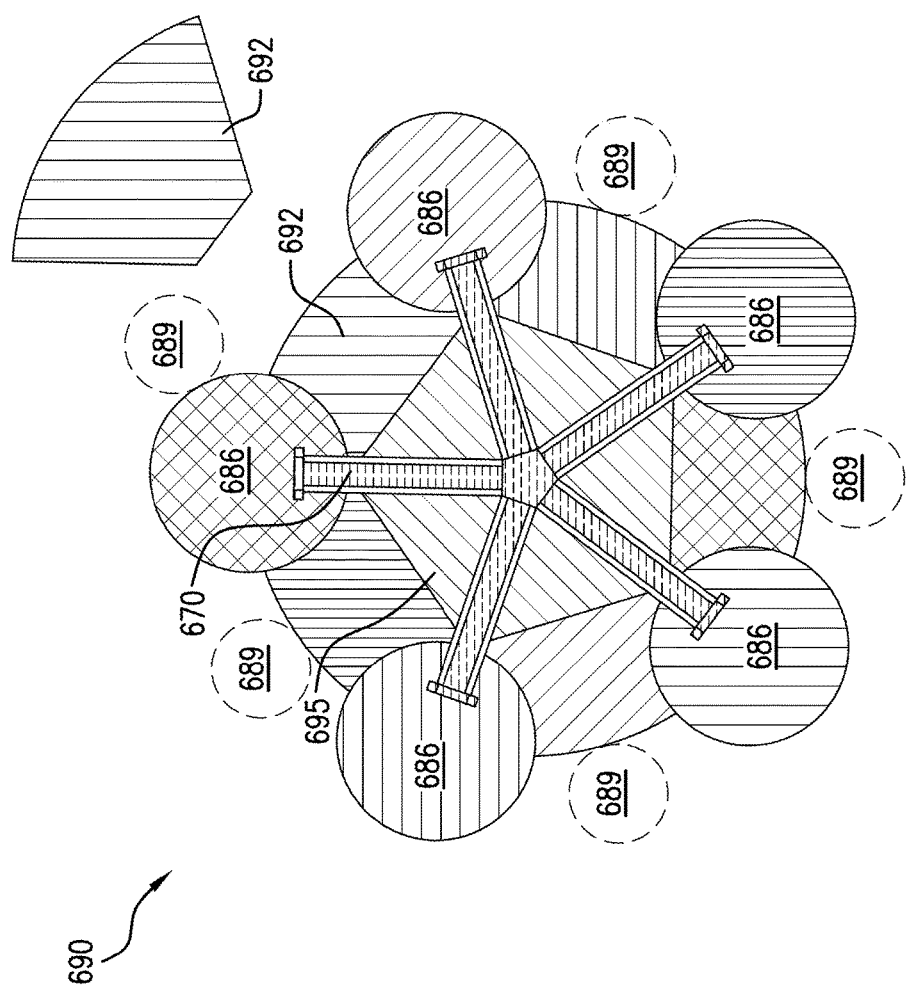
FIG. 27 shows a perspective view of a fourth embodiment workstation arrangement based on the seventh embodiment workstation module (pentagon module).

FIG. 27 shows a perspective view of a fourth embodiment workstation arrangement 690 based on the seventh embodiment workstation module 670 (pentagon module). A pentagon-shaped table top 695 is positioned over and coupled to the pentagon module 670. Five circular table top 686 are attached at the end of each point of the pentagon module 670 on double-arm table support brackets 564. Three pentagon module interstitial table top 692 are attached on arms 544 between the pentagon-shaped table top 695 and the five circular table tops 686. The locations of five stools 689 are shown as they may be used with fourth embodiment workstation arrangement 690.

Figure 28:
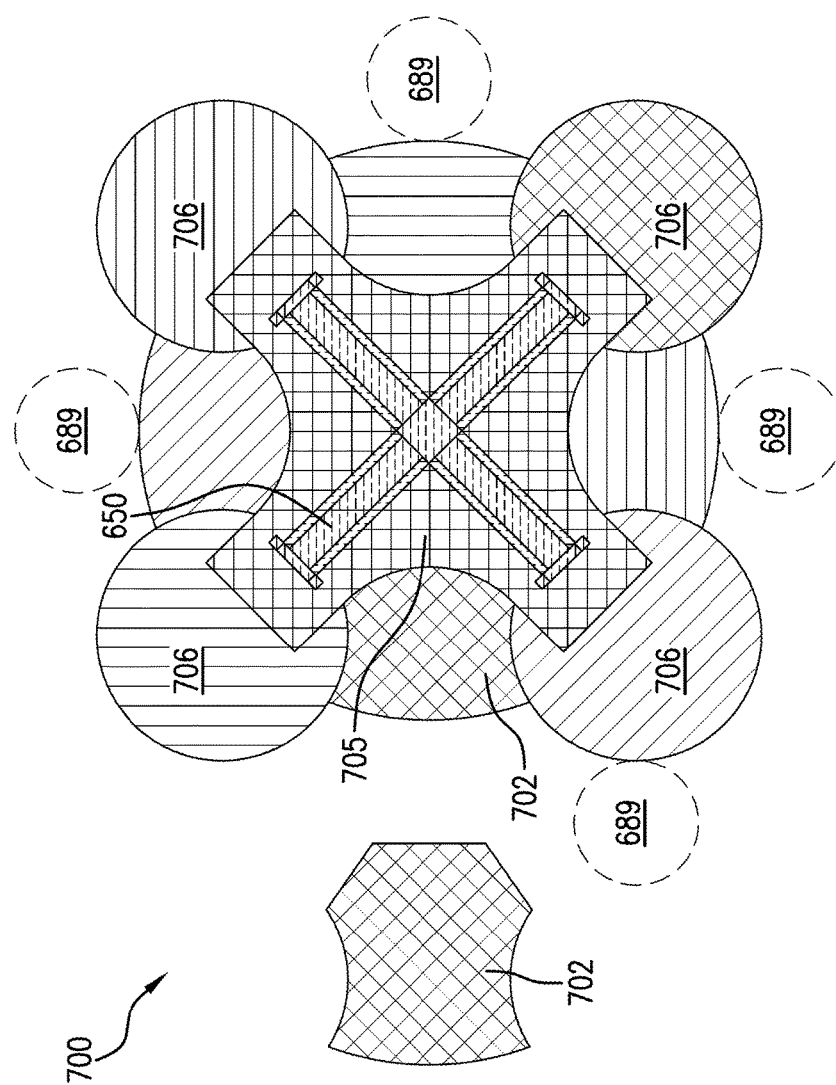
FIG. 28 shows a perspective view of a fifth embodiment workstation arrangement based on the fifth embodiment workstation module (X module).

FIG. 28 shows a perspective view of a fifth embodiment workstation arrangement 700 based on the fifth embodiment workstation module 650 (X module). A X-shaped table top 705 is positioned over and coupled to the X module 650. Four circular table top 686 are attached at the end of each point of the X module 650 on double-arm table support brackets 564. Four X module interstitial table tops 702 are attached on arms 544 between the X-shaped table top 705 and the four circular table tops 686. The locations of four stools 689 are shown as they may be used with fifth embodiment workstation arrangement 700.

What is claimed is:

1. A workstation module comprising:
a first rail beam comprising a plurality of rails that are tubular and rectangular in cross-section, arranged in parallel lengthwise, wherein the first rail beam is configured so that between each of the plurality of rails there is a gap that is at least as large as a largest cross-sectional dimension of one of the plurality of rails;
a first rail-arm-leg module comprising a plurality of columns coupled by a bottom plate and a plurality of cross plates, with the columns oriented orthogonal to the cross plates and the bottom plate, wherein the columns and the cross plates define a module interior;
wherein each of the rails of the first rail beam is in sliding contact with at least one of the columns of the first rail-arm-leg module; and
wherein the first rail beam is coupled to the first rail-arm-leg module.

2. The workstation module of claim 1,
wherein the columns comprise hollow tubes with open top ends; and
further comprising an arm positioned within one of the columns of the first rail-arm-leg modules, the arm shaped and sized to provide a sliding contact with the column.

3. The workstation module of claim 1,
wherein the first rail beam fits into the module interior of the first rail-arm-leg module with a sliding fit.

4. A workstation module comprising:
a first rail beam comprising a plurality of rails that are tubular and rectangular in cross-section, arranged in parallel lengthwise, wherein the first rail beam is configured so that between each of the plurality of rails there is a gap that is at least as large as a largest cross-sectional dimension of one of the plurality of rails;
a first rail-arm-leg module comprising a plurality of columns coupled by a bottom plate and a plurality of cross plates, with the columns oriented orthogonal to the cross plates and the bottom plate, wherein the columns and the cross plates define a module interior;
wherein each of the rails of the first rail beam is in sliding contact with at least one of the columns of the first rail-arm-leg module;
wherein the first rail beam is coupled to the first rail-arm-leg module;
wherein the first rail beam fits into the module interior of the first rail-arm-leg module with a sliding fit;
wherein the first rail beam is a quad-rail beam with four rails arranged in a pattern that is rectangular in cross-section;
wherein the first rail-arm-leg module is an open quad rail-arms-leg module with two columns and two cross plates;
further comprising two clamp plates positioned within the module interior, wherein each clamp plate is adjacent two of the four rails; and
further comprising four fasteners, each fastener passing through one of the cross plates, through one of the clamp plates and passing adjacent to one of the rails.

5. The workstation module of claim 4, further comprising an arm bracket clamped to two of the plurality of rails with a clamp plate and with at least two fasteners;
wherein the arm bracket comprises an arm tube coupled to an arm bracket plate;
wherein the arm bracket plate has two arm bracket lips that are positioned to match a distance across the rails and hold the arm bracket onto the rails; and
an arm positioned within the arm tube, the arm shaped and sized to provide a sliding contact with the arm tube.

6. The workstation module of claim 3,
wherein the first rail beam is a twin rail beam with two rails, one above the other;
wherein the first rail-arm-leg module is a twin rail-arms-leg module with two columns and two cross plates; and
wherein one of the two rails is coupled to the one of the cross plates and the other of the two rails is coupled to the other of the two cross plates.

7. The workstation module of claim 6,
wherein the two rails each have a fastener hole penetrating through the rail orthogonal to a long axis of the rail;
wherein the cross plates each have a fastener hole;
wherein one of the two rails is coupled to the one of the cross plates with a first fastener passing through the fastener holes in the rail and the cross plate; and wherein the other of the two rails is coupled to the other of the two cross plates with a second fastener passing through the fastener holes in the rail and the cross plate.

8. The workstation module of claim 7,
wherein the two rails are perforated rails with fastener holes penetrating through the rail orthogonal to a long axis of the rail, the fastener holes spaced at periodic intervals along the long axis of the rail.

9. The workstation module of claim 8, further comprising
a double drop-on rail clip bracket with two arm tubes coupled by a single bolt plate with a single fastener hole;
wherein the double drop-on rail clip bracket is configured to drop on to the twin rail beam with a sliding fit; and
wherein the double drop-on rail clip bracket is coupled to the twin rail beam with a single fastener that passes through the fastener hole in the bolt plate of the double drop-on rail clip bracket and through the fastener hole of a top rail of the twin rail beam.

10. The workstation module of claim 8, further comprising
a side mount bolt-on arm bracket with an arm tube and two bolt plates each with a fastener hole configured to line up with a fastener hole in one of the rails of the twin rail beam;
wherein the fastener holes in one of the bolt plates lining up with the fastener hole in an upper two rail of the twin rail beam, and the fastener hole in the other bolt plate lining up with the fastener hole in a lower two rail of the twin rail beam; and
two fasteners passed through the fastener holes in the side mount bolt-on arm bracket and the rails.

11. The workstation module of claim 3,
wherein the first rail beam is a quad-rail beam with four rails arranged in a pattern that is rectangular in cross-section;
wherein the four rails are perforated rails with fastener holes penetrating through the rail orthogonal to a long axis of the rail, the fastener holes spaced at periodic intervals along the long axis of the rail;
wherein the first rail-arm-leg module is a split quad rail-arms-leg module with four cross plates and with three columns, including a center column and two side columns;
wherein the module interior is divided by the center column into two partial module interiors;
wherein each of the rails of the first rail beam is in sliding contact with at least one of the side columns of the first rail-arm-leg module and in sliding contact with the center column; and wherein each of the rails is coupled to the one of the cross plates.

12. The workstation module of claim 11, further comprising
a top mount bolt-on arm bracket with an arm tube coupled to two bolt plates, the bolt plates each with a single fastener hole;
wherein the top mount bolt-on arm bracket is configured for the fastener hole of one of the two bolt plates to line up with a fastener hole in an upper one of the rails of the quad-rail beam and the fastener hole of the other of the two bolt plates to line up with a fastener hole in another upper one of the rails of the quad-rail beam; and
two fasteners passed through the fastener holes in the top mount bolt-on arm bracket and the rails.

13. The workstation module of claim 11, further comprising
a side mount bolt-on arm bracket with an arm tube and two bolt plates each with two fastener holes configured to line up with the fastener holes in the two of the rails of the quad-rail beam;
wherein the fastener holes in one of the bolt plates lining up with the fastener holes in an upper two rails of the quad-rail beam, and the fastener holes in the other bolt plate lining up with the fastener holes in a lower two rails of the quad-rail beam; and
four fasteners passed through the fastener holes in the side mount bolt-on arm bracket and the rails.

14. The workstation module of claim 1,
a second rail-arm-leg module coupled to the first rail beam.

15. The workstation module of claim 14,
a second rail beam coupled the first rail beam; and
a third rail-arm-leg module coupled to the second rail beam.

16. The workstation module of claim 15,
a third rail beam coupled the first rail beam; and
a fourth rail-arm-leg module coupled to the third rail beam.

17. The workstation module of claim 1,
a Y module center coupler;
a second rail-arm-leg module coupled to a second rail beam;
a third rail-arm-leg module coupled to a third rail beam; and
wherein the first rail beam, the second rail beam and the third rail beam are coupled to the Y module center coupler.

* * * * *